United States Patent
Funamizu et al.

(10) Patent No.: US 10,554,916 B2
(45) Date of Patent: Feb. 4, 2020

(54) IMAGE SENSOR, IMAGE-CAPTURING APPARATUS AND ELECTRONIC DEVICE

(71) Applicant: NIKON CORPORATION, Tokyo (JP)

(72) Inventors: Wataru Funamizu, Yokohama (JP); Masahiro Juen, Yokohama (JP); Atsushi Komai, Tokorozawa (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/764,066

(22) PCT Filed: Sep. 27, 2016

(86) PCT No.: PCT/JP2016/078478
§ 371 (c)(1),
(2) Date: Mar. 28, 2018

(87) PCT Pub. No.: WO2017/057373
PCT Pub. Date: Apr. 6, 2017

(65) Prior Publication Data
US 2018/0316883 A1 Nov. 1, 2018

(30) Foreign Application Priority Data
Sep. 30, 2015 (JP) ................................ 2015-195279

(51) Int. Cl.
*H04N 5/369* (2011.01)
*H04N 5/3745* (2011.01)
*H04N 5/378* (2011.01)

(52) U.S. Cl.
CPC ........... *H04N 5/3698* (2013.01); *H04N 5/378* (2013.01); *H04N 5/379* (2018.08); *H04N 5/3745* (2013.01)

(58) Field of Classification Search
CPC .... H04N 5/3698; H04N 5/374; H04N 5/3745; H04N 5/37455; H04N 5/378; H03F 2203/21127
See application file for complete search history.

(56) References Cited

U.S. PATENT DOCUMENTS 8,952,311 B2 * 2/2015 Johnson ............... H04N 5/3658
250/208.1
2006/0023109 A1 * 2/2006 Mabuchi ................ H01L 24/17
348/340

(Continued)

FOREIGN PATENT DOCUMENTS

CN 101873137 A 10/2010
JP 2006-049361 A 2/2006

(Continued)

OTHER PUBLICATIONS

Mar. 5, 2018 Office Action issued in Taiwanese Patent Application No. 10513163.

(Continued)

*Primary Examiner* — Lin Ye
*Assistant Examiner* — Chriss S Yoder, III
(74) *Attorney, Agent, or Firm* — Oliff PLC

(57) ABSTRACT

An image sensor includes: a readout circuit that reads out a signal to a signal line, the signal being generated by an electric charge resulting from a photoelectric conversion; a holding circuit that holds a voltage based on an electric current from a power supply circuit; and an electric current source including a transistor having a drain part connected to the signal line and a gate part connected to the holding circuit and the drain part, the electric current source supplying the signal line with an electric current generated by the voltage held in the holding circuit.

29 Claims, 14 Drawing Sheets

(56) References Cited

U.S. PATENT DOCUMENTS

| | | | | |
|---|---|---|---|---|
| 2009/0090844 A1* | 4/2009 | Yan | ............... | H04N 5/3742 |
| | | | | 250/208.1 |
| 2009/0295968 A1* | 12/2009 | Matsuda | ............. | H04N 5/3651 |
| | | | | 348/308 |
| 2010/0271521 A1* | 10/2010 | Kawaguchi | ......... | H03M 1/0845 |
| | | | | 348/302 |
| 2012/0099010 A1* | 4/2012 | Sugiyama | ......... | H01L 27/14609 |
| | | | | 348/294 |
| 2012/0307100 A1 | 12/2012 | Iwane | | |
| 2014/0263966 A1 | 9/2014 | Hikosaka et al. | | |
| 2016/0182842 A1 | 6/2016 | Mabuchi | | |
| 2018/0288347 A1* | 10/2018 | Komai | ................. | H03M 1/56 |

FOREIGN PATENT DOCUMENTS

| | | |
|---|---|---|
| JP | 2012-244331 A | 12/2012 |
| TW | 201134212 A | 10/2011 |
| WO | 2015/019836 A1 | 2/2015 |

OTHER PUBLICATIONS

Aug. 29, 2017 Office Action issued in Taiwanese Patent Application No. 105131633.
Dec. 20, 2016 Search Report issued in International Patent Application No. PCT/JP2016/078478.
Feb. 11, 2019 Extended Search Report issued in European Patent Application No. 16851544.3.
Oct. 16, 2019 Office Action issued in European Patent Application No. 16851544.3.
Oct. 30, 2019 Office Action issued in Chinese Patent Application No. 201680056855.3.

\* cited by examiner

IMAGE SENSOR, IMAGE-CAPTURING APPARATUS AND ELECTRONIC DEVICE

TECHNICAL FIELD

The present invention relates to an image sensors, an image-capturing apparatus sensor, and an electronic device.

BACKGROUND ART

An image-capturing apparatus has been known which can perform parallel processing on a signal read from a pixel for individual unit pixel cells or for individual cells including a plurality of pixels (PTL1).

CITATION LIST

Patent Literature

PTL1: Japanese Laid-Open Patent Publication No. 2012-244331

SUMMARY OF INVENTION

According to the 1st aspect of the present invention, an image sensor comprises: a readout circuit that reads out a signal to a signal line, the signal being generated by an electric charge resulting from a photoelectric conversion; a holding circuit that holds a voltage based on an electric current from a power supply circuit; and an electric current source including a transistor having a drain part connected to the signal line and a gate part connected to the holding circuit and the drain part, the electric current source supplying the signal line with an electric current generated by the voltage held in the holding circuit.

According to the 2nd aspect of the present invention, an image sensor comprises: a first readout circuit that reads out a first signal to a first signal line, the first signal being generated by an electric charge resulting from a photoelectric conversion; a second readout circuit that reads out a second signal to a second signal line, the second signal being generated by an electric charge resulting from a photoelectric conversion; a first holding circuit that holds a voltage based on an electric current from a power supply circuit; a second holding circuit that holds a voltage based on the electric current from the power supply circuit; a first electric current source including a first transistor having a first drain part connected to the first signal line and a first gate part connected to the first holding circuit and the first drain part, the first electric current source supplying the first signal line with an electric current generated by the voltage held in the first holding circuit; and a second electric current source including a second transistor having a second drain part connected to the second signal line and a second gate part connected to the second holding circuit and the second drain part, the second electric current source supplying the second signal line with an electric current generated by the voltage held in the second holding circuit.

According to the 3rd aspect of the present invention, an electronic device, comprises: an electronic circuit having a plurality of electronic elements; a holding circuit that holds a voltage based on an electric current from a power supply circuit; and an electric current source including a transistor having a drain part connected to the electronic circuit and a gate part connected to the holding circuit and the drain part, the electric current source supplying the electronic circuit with an electric current generated by the voltage held in the holding circuit.

DESCRIPTION OF EMBODIMENTS

First Embodiment

Figure 1:
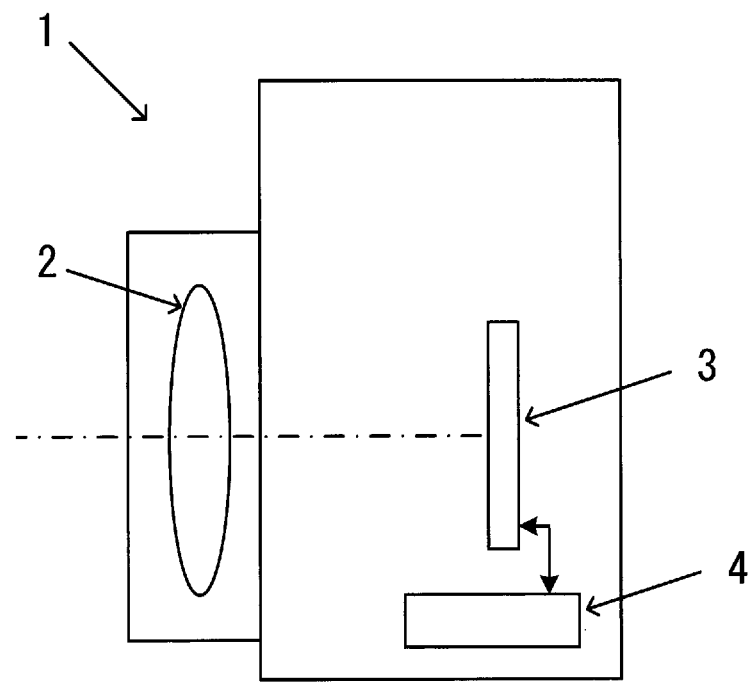
FIG. 1 is a block diagram illustrating a configuration of an image-capturing apparatus 1 according to a first embodiment.

FIG. 1 is a block diagram illustrating a configuration of an image-capturing apparatus 1 according to a first embodiment. The image-capturing apparatus 1 includes an optical system 2, an image sensor 3, and a control unit 4. The optical system 2 emits light from a subject to the image sensor 3. The image sensor 3 captures an image of the light emitted from the optical system 2 to generate image data, for example. The control unit 4 performs various image processes on the image data outputted from the image sensor 3. Additionally, the control unit 4 outputs a control signal for controlling an operation of the image sensor 3 to the image sensor 3. It should be noted that the optical system 2 may be detachably mounted in the imaging apparatus 1.

Figure 2:
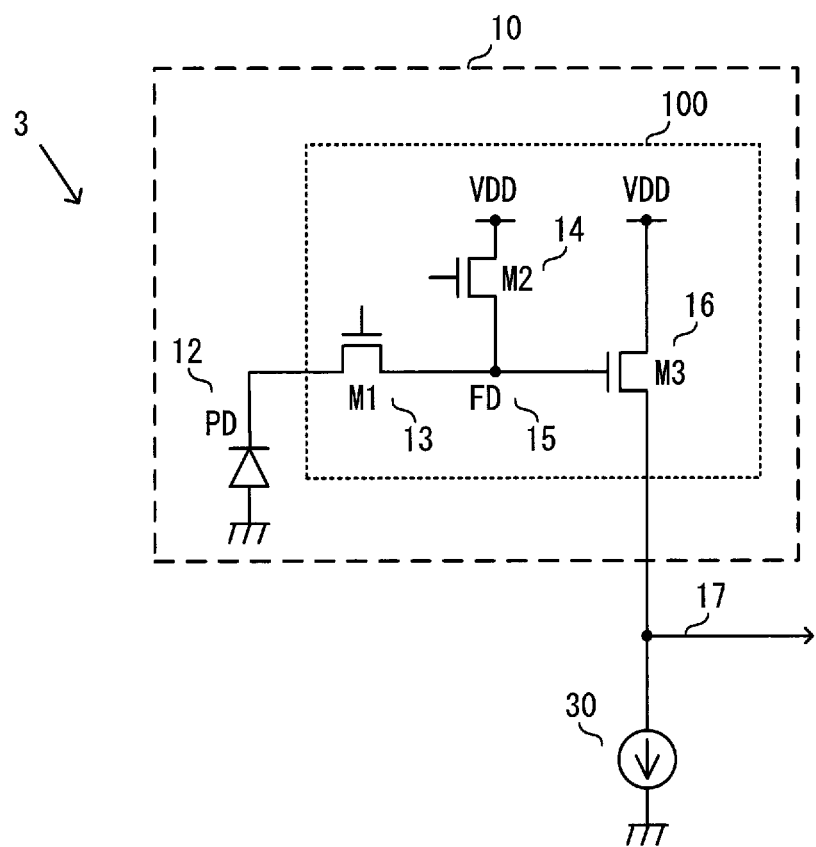
FIG. 2 is a circuit diagram illustrating a configuration of a pixel 10 according to the first embodiment.

FIG. 2 is a circuit diagram illustrating a configuration of a pixel 10 according to the first embodiment. The image sensor 3 has a plurality of pixels 10. The pixel 10 includes a photoelectric conversion unit 12 and a readout circuit 100. The photoelectric conversion unit 12 is arranged, for example, in a matrix in an image-capturing region of the image sensor 3. The photoelectric conversion unit 12 has a photoelectric conversion function of converting incident light into an electric charge. The photoelectric conversion unit 12 accumulates the electric charge resulting from the photoelectric conversion. The photoelectric conversion unit 12 is composed of a photodiode, for example. The readout circuit 100 reads out a pixel signal to a signal line 17, the pixel signal being generated by the electric charge resulting from the photoelectric conversion performed by the photoelectric conversion unit 12. The pixel signal represents image data, for example. The readout circuit 100 includes a transfer unit 13, a discharge unit 14, a floating diffusion 15, and an output unit 16.

The transfer unit 13 transfers the electric charge resulting from the photoelectric conversion performed by the photoelectric conversion unit 12 to the floating diffusion 15. In other words, the transfer unit 13 forms an electric charge transfer path between the photoelectric conversion unit 12 and the floating diffusion 15. The output unit 16 outputs a pixel signal to the signal line 17, the pixel signal being generated by the electric charge transferred by the transfer unit 13 from the photoelectric conversion unit 12 to the floating diffusion 15. The output unit 16 is a transistor having a drain terminal, a gate terminal, and a source terminal that are respectively connected to a power supply VDD, the floating diffusion 15, and the signal line 17. The discharge unit 14 discharges the electric charge in the floating diffusion 15. The floating diffusion 15 is reset to a reference potential as a result of the discharge of the electric charge by the discharge unit 14.

An electric current source 30 is connected to the readout circuit 100 via the signal line 17. The electric current source 30 supplies an electric current for causing the readout circuit 100 to read out the pixel signal generated by the electric charge resulting from the photoelectric conversion performed by the photoelectric conversion unit 12. Specifically, the electric current source 30 is a transistor having a drain terminal, a gate terminal, and a source terminal that are respectively connected to the signal line 17, a reference electric current source circuit 31, and a ground (GND). The electric current source 30 supplies an electric current to the output unit 16 of the readout circuit 100. In other words, the output unit 16 forms a source follower circuit with the electric current source 30 as a load electric current source.

The electric current source 30 generates the electric current to be supplied to the signal line 17, based on an electric current from the reference electric current source circuit 31. Additionally, the electric current source 30 has a drain terminal and a gate terminal that are connected to each other via a switch.

Figure 3:
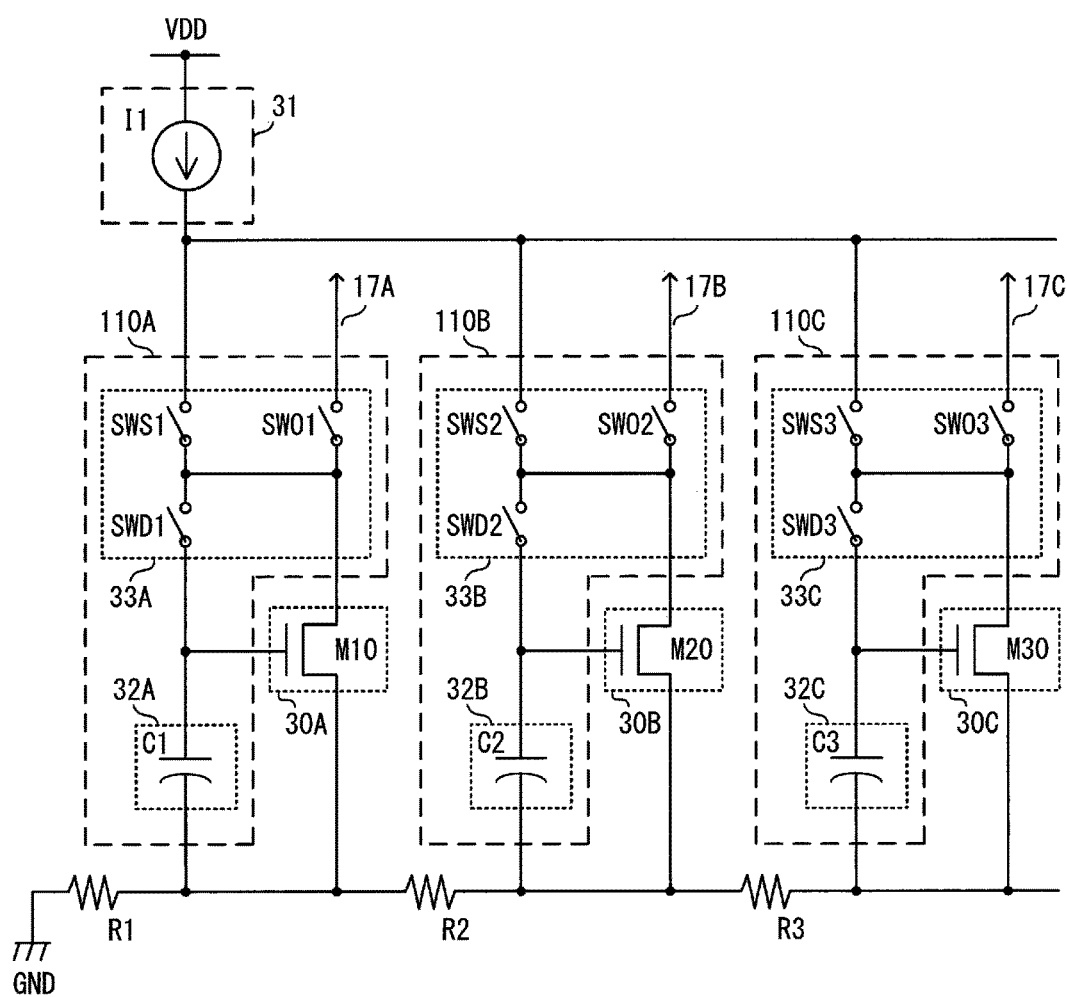
FIG. 3 is a circuit diagram illustrating a configuration of an electric current source 30 and a storage circuit 110 according to the first embodiment.

FIG. 3 is a circuit diagram illustrating a configuration of the electric current sources 30 according to the first embodiment and storage circuits (also referred to as holding circuits) 110 for generating an electric current to be supplied to the signal line 17 by the electric current source 30. The example in FIG. 3 illustrates only three current sources 30 (electric current sources 30A to 30C) for the sake of simplification of description.

The reference electric current source circuit 31 has a reference electric current source I1. The reference electric current source I1 is connected to the power supply VDD and outputs a reference electric current i1. The electric current source 30 supplies the signal line 17 with an electric current corresponding to the reference electric current i1 outputted from the reference electric current source I1.

The storage circuit 110 has a storage unit 32 and a control unit 33. The storage circuit 110 (each storage circuit 110A to 110C) stores a voltage based on the reference electric current i1 outputted from the reference electric current source I1. The storage unit 32 of the storage circuit 110 stores (holds) the voltage based on the reference electric current i1 outputted from the reference electric current source I1. The storage unit 32 is connected to the gate terminal of the electric current source 30 and supplies the electric current source 30 with the voltage stored (held) in the storage unit 32.

The electric current source 30 supplies the signal line 17 with an electric current based on the voltage stored in the storage unit 32. The storage unit 32 is constituted of a capacitive element such as a capacitor having one electrode connected to the gate terminal of the electric current source 30 and the other electrode connected to the ground, for example. In the example illustrated in FIG. 3, the storage units 32 (i.e., the storage units 32A to 32C) are respectively composed of capacitors C1 to C3.

The control unit 33 controls the electric current supplied from the reference electric current source circuit 31 to the storage unit 32. For example, when the voltage based on the electric current outputted from the reference electric current source I1 is to be stored in the storage unit 32A, the control unit 33 controls electric currents supplied from the reference electric current source I1 to the storage unit 32B and the storage unit 32C to be smaller than the electric current supplied from the reference electric current source I1 to the storage unit 32A.

The control unit 33 includes switches that connect the reference electric current source circuit 31 and the storage unit 32, for example. Each control unit 33 (the control unit 33A to 33C) has a switch SWS (SWS1 to SWS3, respectively), a switch SWD (SWD1 to SWD3, respectively), and a switch SWO (SWO1 to SWO3, respectively).

Each of the switches SWS (SWS1 to SWS3), SWD (SWD1 to SWD3), and SWO (SWO1 to SWO3) is composed of a transistor, for example. The switches SWS (SWS1 to SWS3), SWD (SWD1 to SWD3), and SWO (SWO1 to SWO3) are controlled by a control signal outputted by a control circuit (not shown). It should be noted that resistors R1 to R3 are wiring resistors of a wiring connected to the ground.

Figure 4:
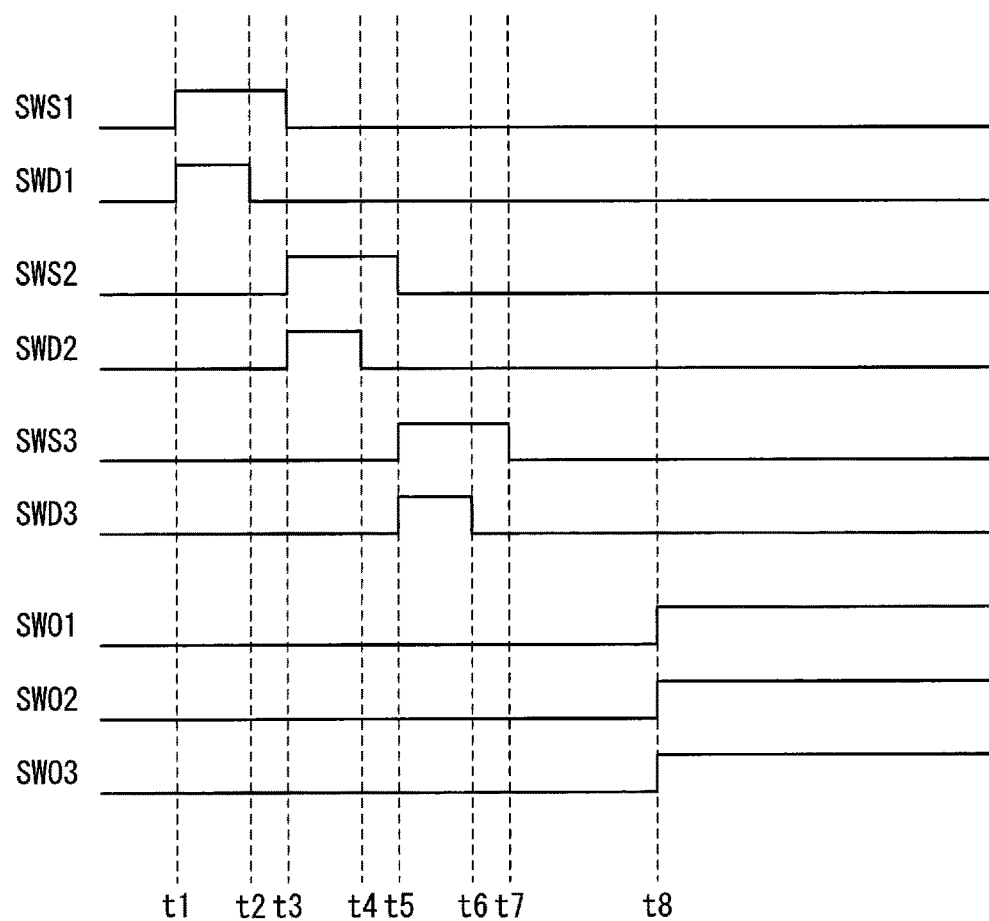
FIG. 4 is a timing chart illustrating an exemplary operation of a control unit 33 according to the first embodiment.

FIG. 4 is a timing chart illustrating an exemplary operation of the control unit 33 according to the first embodiment.

In FIG. 4, symbols SWS1 to SWS3, SWD1 to SWD3, and SWO1 to SHO3 denotes control signals inputted from the control circuit to the switches SWS (SWS1 to SWS3), SWD (SWD1 to SWD3), and SWO (SWO1 to SHO3). Additionally, the vertical axis represents voltage level of the control signals outputted from the control circuit (not shown), and the horizontal axis represents time. The switches SWS (SWS1 to SWS3), SWD (SWD1 to SWD3), and SWO (SWO1 to SHO3) are turned on if the input control signal is at a high level and turned off if the input control signal is at a low level.

At a time t1, the switches SWS1 and SWD1 are turned to high level. Once the switch SWD1 is turned on, the gate terminal and the drain terminal of the electric current source 30A are connected to each other. As a result, the electric current source 30A is diode-connected. Furthermore, turning on the switch SWS1 connects the reference electric current source I1 with the electric current source 30A and the storage unit 32A. This causes the reference electric current i1 to be supplied from the reference electric current source I1 to the electric current source 30A and the storage unit 32A.

A gate-source voltage Vgs of the electric current source 30A is a value depending on the reference electric current i1 and a threshold voltage Vth1 of the electric current source 30A. The voltage Vg1 applied to the gate terminal of the electric current source 30A is a value depending on the gate-source voltage Vgs of the electric current source 30A and is a voltage based on the reference electric current i1 and the threshold voltage Vth1 of the electric current source 30A. The voltage Vg1 based on the reference electric current i1 is stored in the storage unit 32A.

At a time t2, the switch SWD1 is turned to low level. Once the switch SWD1 is turned off, the reference electric current source I1 and the storage unit 32A are disconnected. The gate-source voltage Vgs of the electric current source 30A is stored in the storage unit 32A. Turning off the switch SWD1 prior to the switch SWS1 can prevent the voltage Vg1 stored in the storage unit 32A from dropping through the electric current source 30A.

At a time t3, the switch SWS1 is turned to low level. Once the switch SWS1 is turned off, the reference electric current source I1 and the storage unit 30A are disconnected. Likewise, turning on the switch SWS2 and the switch SWD2 connects the reference electric current source I1 with the electric current source 30B and the storage unit 32B. This causes the reference electric current i1 to be supplied from the reference electric current source I1 to the electric current source 30B and the storage unit 32B. In a period from a time t4 to a time t5, the switch SWD2 and the switch SWS2 are turned to low level. Once the switch SWD2 and the switch SWS2 is turned off, the reference electric current source I1 and the storage unit 32B are disconnected. The gate-source voltage Vgs of the electric current source 30B is stored in the storage unit 32B.

At a time t5, the switches SWS3 and SWD3 are turned to high level. Turning on the switch SWS3 and the switch SWD3 connects the reference electric current source I1 with the electric current source 30C and the storage unit 32C. This causes the reference electric current i1 to be supplied from the reference electric current source I1 to the electric current source 30C and the storage unit 32C. In a period from a time t6 to a time t7, the switches SWD3 and SWS3 are turned to low level. Once the switches SWD3 and SWS3 are turned off, the reference electric current source I1 and the storage unit 32C are disconnected. The gate-source voltage Vgs of the electric current source 30C is stored in the storage unit 32C.

At a time t8, the switches SWO1 to SWO3 are turned to high level. Once the switches SWO1 to SWO3 are turned on, the electric current sources 30A to 30C supply the signal lines 17A to 17C with electric currents based on the voltages Vg1 to Vg3 applied to the respective gate terminals.

Figure 5:
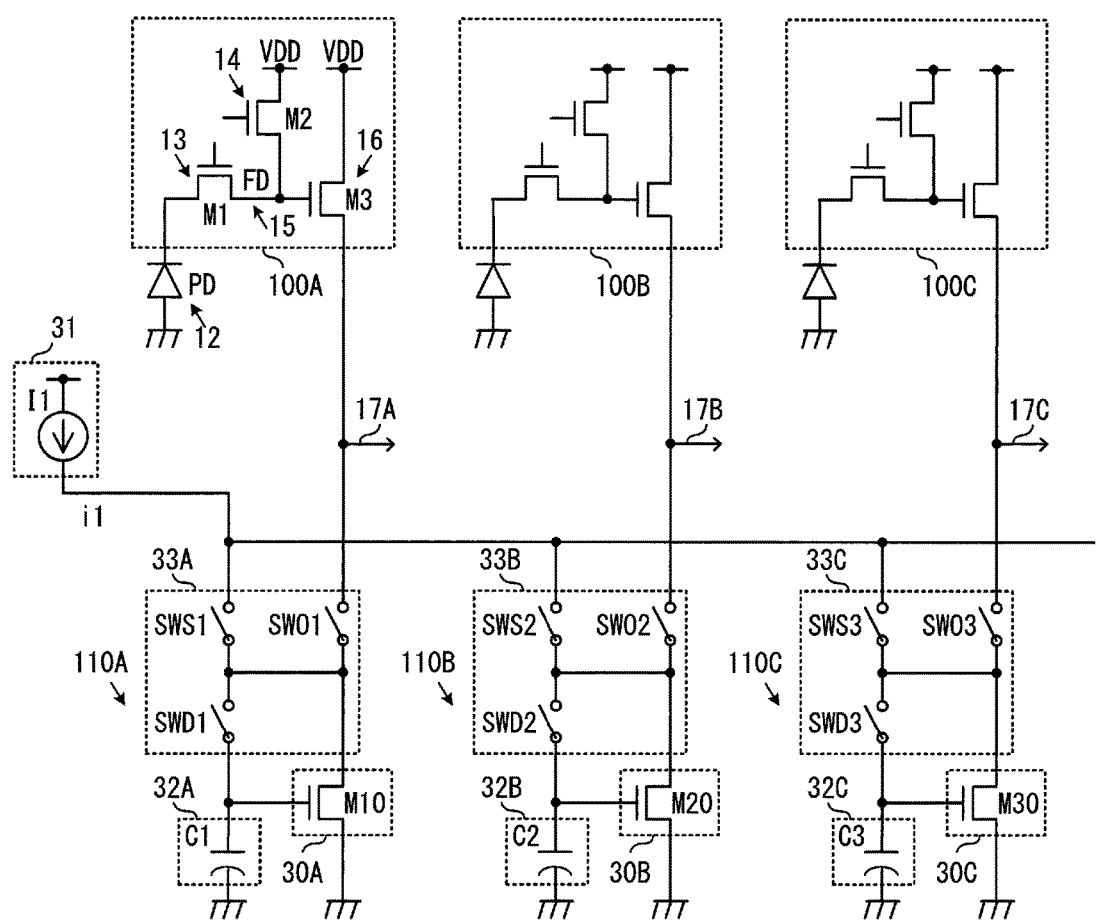
FIG. 5 is a circuit diagram illustrating an exemplary application of the electric current source 30 according to the first embodiment.

FIG. 5 is a circuit diagram illustrating an exemplary application of the electric current source 30 according to the first embodiment. The electric current sources 30A to 30C supply electric currents to the output units 16 of the respective readout circuits 100A to 100C via the signal lines 17.

The electric current sources 30A to 30C are supplied with the reference electric current from the reference electric current source I1 by the control units 33A to 33C. The electric current sources 30A to 30C are supplied with the reference electric current i1 in the order of the electric current source 30A, the electric current source 30B, and the electric current source 30C by means of the switches SWS1 to SWS3, SWD1 to SWD3, and SWO1 to SWO3 of the control units 33A to 33C. As a result, voltages based on the reference electric current i1 from the reference electric current source I1 are stored in the storage units 32A to 32C. In other words, the voltages Vg1 to Vg3 based on the reference electric current i1 and the threshold voltages Vth1 to Vth3 of the electric current sources 30A to 30C are stored in the storage units 32A to 32C, respectively.

The electric current sources 30A to 30C supply the signal lines 17A to 17C with electric currents generated by the voltages based on the reference electric current i1 from the reference electric current source I1 stored in the storage units 32A to 32C, respectively. In other words, the electric current sources 30A to 30C supply the respective output units 16 of the readout circuits 100A to 100C with electric currents generated by the voltages Vg1 to Vg3 based on the reference electric current i1 from the reference electric current source I1 stored in the storage units 32A to 32C, respectively.

Figure 6:
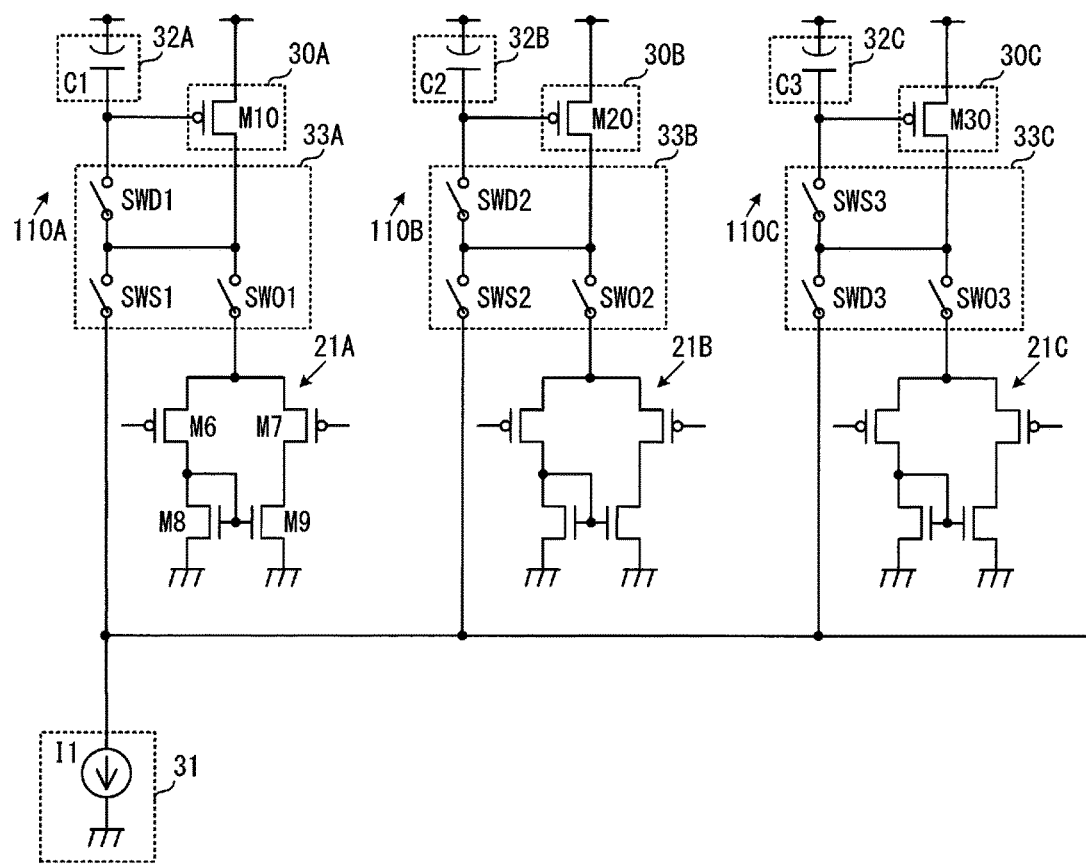
FIG. 6 is a circuit diagram showing another exemplary application of the electric current source 30 according to the first embodiment.

FIG. 6 is a circuit diagram illustrating another exemplary application of the electric current source 30 according to the first embodiment. Although FIG. 5 illustrates the exemplary application in which the electric current sources 30A to 30C supply electric currents to the corresponding readout circuits 100, the present invention is not limited to this. FIG. 6 illustrates an exemplary application in electric current sources of comparator circuits 21A to 21C constituting a part of an analog/digital conversion circuit that is connected to the signal lines 17A to 17C illustrated in FIG. 5 and converts the pixel signals read out by the readout circuit 100 into digital signals.

The electric current sources 30A to 30C supply the respective comparator circuits 21A to 21C with electric currents. In the example illustrated in FIG. 6, the electric current sources 30A to 30C are composed of PMOS transistors M10 to M30. The comparator circuit 21 includes transistors M6 to M9, for example. The transistors M6 and M7 have their source terminals commonly connected to form a differential pair. The transistors M8 and M9 function as an active load unit. A pixel signal is inputted to the gate terminal of one of the transistors M6 and M7 from the signal line 17A to 17C illustrated in FIG. 5 directly or via a capacitor or other elements, and a reference signal is inputted to the gate terminal of the other of the transistors M6 and M7 directly or via a capacitor or other elements. The electric current sources 30A to 30C supply source terminals of the transistors M6 and M7 with electric currents and thus function as tail electric current sources of the comparator circuits 21.

The comparator circuit 21 outputs an output signal generated by comparing the pixel signal and the reference signal, to a latch circuit. Based on the output signal of the comparator circuit 21, the latch circuit holds a count value as a function of the time elapsed since the start of the comparison.

The electric current sources 30A to 30C are supplied with the reference electric current from the reference electric current source I1 by the control units 33A to 33C. The electric current sources 30A to 30C are supplied with the reference electric current i1 in the order of the electric current source 30A, the electric current source 30B, and the electric current source 30C by means of the switches SWS1 to SWS3, the switches SWD1 to SWD3, and the switches SWO1 to SWO3 of the control units 33A to 33C. As a result, voltages based on the reference electric current i1 from the reference electric current source I1 are stored in the storage units 32A to 32C. In other words, the voltages Vg1 to Vg3 based on the reference electric current i1 and the threshold voltages Vth1 to Vth3 of the electric current sources 30A to 30C are stored in the storage units 32A to 32C, respectively.

The electric current sources 30A to 30C supply the comparator circuits 21A to 21C with electric currents generated by the voltages based on the reference electric current i1 from the reference electric current source I1 stored in the storage units 32A to 32C, respectively. In other words, the electric current sources 30A to 30C supply the comparator circuits 21A to 21C with electric currents generated by the voltages Vg1 to Vg3 based on the reference electric current i1 from the reference electric current source I1 stored in the storage units 32A to 32C, respectively.

Although the above embodiment illustrates the electric current source 30 as an electric current source for the readout circuit 100, which reads out the pixel signal, included in the image sensor 3 and an electric current source for the comparator circuit 21 of the analog/digital conversion circuit that converts the pixel signal into the digital signal, the present invention is not limited to this. The electric current source 30 is also applicable as an electric current source for other source follower circuits in addition to the electronic circuits included in the image sensor 3. The electric current source 30 is further applicable to electronic circuits other than the source follower circuits.

According to the above embodiment, the following operational advantages can be achieved.

(1) The image sensor 3 includes the readout circuit 100 that reads out a signal generated by an electric charge resulting from the photoelectric conversion to the signal line 17, the storage circuit 110 that stores a voltage based on the electric current i1 from the reference electric current source I1, and the electric current supply 30 that supplies the signal line 17 with an electric current for causing the readout circuit 100 to read out a signal and supplies the signal line 17 with an electric current generated by the voltage stored in the storage circuit 110. In the first embodiment, the electric current source 30 supplies the signal line 17 with the electric current generated by the voltage stored in the storage circuit 110. The influence of an IR drop can thus be reduced.

(2) In the first embodiment, after the switch SWO is turned on, the electric current source 30 generates an electric current based on the voltage stored in the storage unit 32. The electric current generated by the electric current source 30 flows to the ground via the wiring resistor (R1 to R3). In the ground wiring, a voltage drop (an IR drop) due to an IR product of the electric current and the resistance occurs so that a source voltage of the electric current source 30 increases. Since the storage unit 32 holds a relative voltage between the gate and the source of the electric current source 30, the voltage Vg increases as the source voltage of the electric current source 30 increases, so that fluctuations in the gate-source voltage is reduced. The reduction in fluctuations of the gate-source voltage can lead to a reduction in fluctuations of the electric current supplied by the electric current source 30.

(3) The electric current source 30 includes a transistor having a drain part connected to the signal line 17 and a gate part connected to the storage circuit 110 and the drain part. In this way, the storage circuit 110 can store a voltage based on the threshold voltage Vth of the transistor and the reference electric current i1. Additionally, the electric current source 30 can supply an electric current that is less influenced by fluctuations in the threshold voltage Vth.

(4) The image sensor 3 includes the first readout circuit 100A that reads out a first signal to the signal line 17A, the first signal being generated by the electric charge resulting from the photoelectric conversion, the second readout circuit 100B that reads out a second signal to the signal line 17B, the second signal being generated by the electric charge resulting from the photoelectric conversion, the first storage circuit 110A that stores a voltage based on the electric current i1 from the reference electric current source I1, the second storage circuit 110B that stores a voltage based on the electric current i1 from the reference electric current source I1, the first electric current supply 30A that supplies the first signal line 17A with an electric current for causing the first readout circuit 100A to read out a first signal and supplies the first signal line 17A with an electric current generated by the voltage stored in the first storage circuit 110A, and the second electric current supply 30B that supplies the second signal line 17B with an electric current for causing the second readout circuit 100B to read out a second signal and supplies the second signal line 17B with an electric current generated by the voltage stored in the second storage circuit 110B. In the first embodiment, the first current source 30A supplies the signal line 17A with the electric current generated by the voltage stored in the first storage circuit 110A, and the second current source 30B supplies the signal line 17B with the electric current generated by the voltage stored in the second storage circuit 110B. The influence of an IR drop can thus be reduced in a plurality of signal lines.

(5) After the voltage based on the electric current i1 from the reference electric current source I1 is stored in the first storage circuit 110A, the second storage circuit 110B stores the voltage based on the electric current i1 from the reference electric current source I1. In this way, the voltage based on the electric current i1 from the reference electric current source I1 can be sequentially stored in the plurality of storage circuits 110.

(6) The first storage circuit 110A has the first control unit 33A that controls the electric current i1 from the reference electric current source I1 when the first readout circuit 100A reads out the first signal to the first signal line 17A to be smaller than that when the first readout circuit 100A does not read out the first signal to the first signal line 17A, and the second storage circuit 110B has the second control unit 33B that controls the electric current i1 from the reference electric current source I1 when the second readout circuit 100B reads out the second signal to the second signal line 17B to be smaller than that when the second readout circuit 100B does not read out the second signal to the second signal line 17B. In this way, the readout circuit 100 can read out the pixel signal to the signal line 17 based on the electric current generated by the voltage stored in the storage circuit 110. Additionally, power consumption can be reduced by adjusting to reduce the electric current i1 from the reference electric current source I1.

(7) The first current source 30A includes the first transistor M10 having the first drain part connected to the first signal line 17A and the first gate part connected to the first storage circuit 110A and the first drain part, and the second current source 30B includes the second transistor M20 having the second drain part connected to the second signal line 17B and the second gate part connected to the second storage circuit 110B and the second drain part. In this way, the storage circuit 110A stores a voltage based on the threshold voltage Vth1 of the transistor M10 and the reference electric current i1, and the storage circuit 110B stores a voltage based on the threshold voltage Vth2 of the transistor M20 and the reference electric current i1. Additionally, the first electric current source 30A and the second electric current source 30B can supply an electric current that is less influenced by fluctuations in the threshold voltage Vth.

Second Embodiment

Referring to FIG. 7, an image sensor 3 according to a second embodiment will be described. It should be noted that parts that are the same or equivalent to those in the first embodiment are denoted by the same reference numerals in the figure, and differences will be mainly described. The image sensor 3 according to the second embodiment further includes an electric current source circuit 50 having a first storage unit 32 that stores a voltage based on the electric current i1 from the reference electric current source I1 and a supply unit 130 that supplies an electric current generated by the voltage stored in the first storage unit 32, wherein the electric current source 30 generates an electric current to be supplied to the readout circuit 100 based on the electric current from the electric current source circuit 50.

Figure 7A:
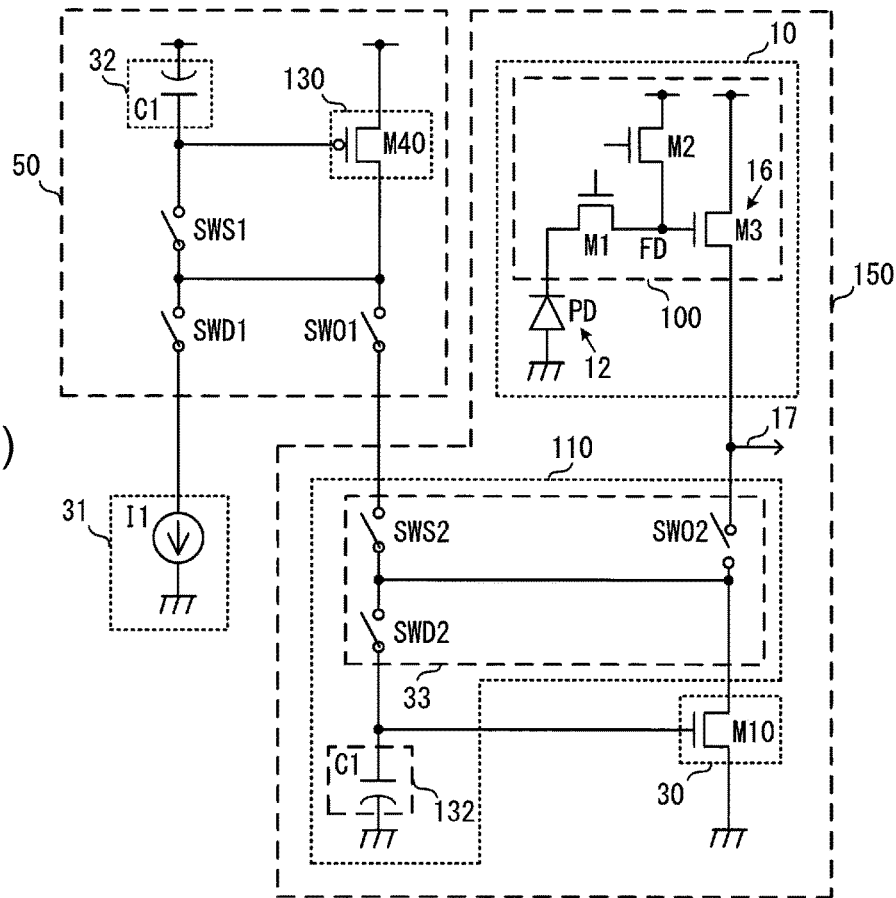
FIG. 7(a) is a circuit diagram illustrating a part of a pixel circuit 150, an electric current source circuit 50, and a reference electric current source circuit 31 according to a second embodiment.
Figure 7B:
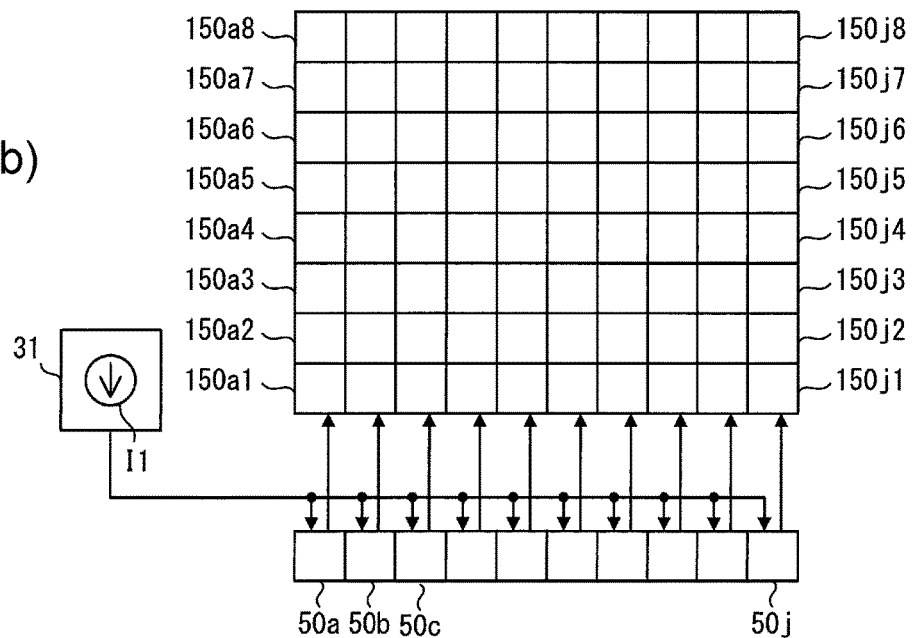
FIG. 7(b) is a diagram illustrating a connection relationship between a part of the pixel circuit 150, the electric current source circuit 50, and the reference electric current source circuit 31 according to the second embodiment.

FIG. 7(a) is a circuit diagram illustrating a part of the pixel circuit 150, the electric current source circuit 50, and the reference electric current source circuit 31, according to the second embodiment. FIG. 7(b) is a diagram illustrating a connection relationship between a part of the pixel circuit 150, the electric current source circuit 50, and the reference electric current source circuit 31 according to the second embodiment.

An example illustrated in FIG. 7(b) illustrates a pixel circuit 150 having eight rows and ten columns. Each pixel circuit 150 includes pixels 10 and also includes electric current sources 30 and storage circuits 110 that are arranged for individual pixels 10. The number of the pixel circuits 150 is the same as the number of the pixels 10 of the image sensor 3. The number of the current source circuits 50 is equal to the number of columns of the pixel circuits 150 of the image sensor 3. Additionally, the number of the current source circuits 50 may be larger than the number of columns of the pixel circuits 150 of the image sensor 3. For example, the number may be the same as the number of the pixel circuits 150 in two rows and ten columns. Since the pixel circuit 150 has ten columns in FIG. 7(b), ten electric current source circuits 50 (current source circuits 50a to 50j) are accordingly illustrated in the figure. As illustrated in FIG. 7(a), each current source circuit 50 includes a supply unit 130, a first storage unit 32, and switches SWS1, SWD1, and SWO1. Each current source circuit 50 is supplied with a reference electric current i1 from the reference electric current source I1 of the reference electric current source circuit 31. Such a configuration of the plurality of current source circuits 50 and the reference electric current source circuit 31 are the same as the configuration of the electric current source 30 and its peripheral circuit illustrated in FIG. 3. It should be noted that the control unit 33 may include the switch SWS1, the switch SWD1, the switch SWO1, the switch SWS2, the switch SWD2, and the switch SWO2. Furthermore, the storage circuit 110 may include the first storage unit 32, the second storage unit 132, the control unit 33, and the supply unit 130.

A connection relationship between the electric current source circuit 50 and the pixel circuit 150 will now be described. In FIG. 7(b), the electric current source circuit 50a located at the left end is connected to a plurality of pixel circuits 150a1, 150a2, 150a3, 150a4, 150a5, 150a6, 150a7, 150a8 located at the left end. In other words, the current source circuit 50a located at the left end is connected to each of the plurality of pixel circuits 150 in the left end column. Likewise, an electric current source circuit 50b next to the electric current source circuit 50a in the leftmost column is connected to a plurality of pixel circuits 150b1 to 150b8 next to the pixel circuits 150a1 to 150a8 in the leftmost column. The same also applies to other columns and the electric current source circuit 50j located at the rightmost is connected to a plurality of pixel circuits 150j1, 150j2, 150j3, 150j4, 150j5, 150j6, 150j7, 150j8 in the rightmost column.

The connection between the electric current source circuit 50 and the pixel circuit 150 is made by connecting the switch SWS2 of the pixel circuit 150 and the switch SWO1 of the electric current source circuit 50 as illustrated in FIG. 7(a). This connection allows the capacitor C1 of the second storage unit 132 of the pixel circuit 150 to be connected to the supply unit 130 of the electric current source circuit 50 via the switches SWD2, SWS2 and the switch SWO1.

For the plurality of current source circuits 50 illustrated in FIG. 7(b), a voltage based on the reference electric current i1 from the reference electric current source I1 is sequentially stored in a capacitor C1 of the first storage unit 32 by turning on and off the switches SWS1 and SWD1, from the electric current source circuit 50a at the leftmost to the electric current source circuit 50j at the rightmost, for example. The on and off control of these switches SWS1 and SWD1 is performed in the same manner as the on and off control of the switches SWS1 and SWD1, the on and off control of the switches SWS2 and SWD2, and the on and off control of the switches SWS3 and SWD3, as illustrated in FIG. 4.

Once the storage of the voltages based on the reference electric current i1 has been completed in all the electric current source circuits 50a to 50j, the switches SWO1 of all the electric current source circuits 50a to 50j are simultaneously turned on in the same manner as the switches SWO1 to SWO3 illustrated in FIG. 4. With the switches SWO1, the supply units 130 for all the electric current source circuits 50a to 50j are ready to supply the pixel circuits 150a to 150j with electric currents based on the reference electric current i1. The supply unit 130 supplies the electric current generated by the voltage stored in the first storage unit 32. The electric current from the electric current source circuit 50 is the same or substantially the same as the reference electric current i1 from the reference electric current source I1 In this manner, each of the electric current source circuits 50a to 50j can generate an electric current based on the reference electric current i1 of the reference electric current source I1 and supply it to the pixel circuits 150a to 150j.

Then, all the switches SWS2, SWD2 of the plurality of pixel circuits 150a1 to 150j1 in the lowermost row are simultaneously turned on. Once the switches are turned on in such a manner, a voltage is stored in the capacitor C1 of the second storage unit 132 by an electric current from the supply unit 130 of each current source circuit 50a to 50j in the pixel circuits 150a1 to 150j1 in the lowermost row. In this manner, voltages based on the electric currents from the plurality of electric current source circuits 50a to 50j are simultaneously stored in the second storage units 132 of the plurality of pixel circuits 150a1 to 150j1 in the lowermost row.

Thereafter, the switches SWS2 and SWD2 are simultaneously turned on in all the plurality of pixel circuits 150a2 to 150j2 in a second row from the bottom, so that voltages are simultaneously stored in the second storage units 132 by electric currents of individual current source circuits 50a to 50j. Likewise, voltages based on the electric currents from the plurality of electric current source circuits 50a to 50j are simultaneously stored in the second storage units 132 of the plurality of pixel circuits 150a8 to 150j8 in the uppermost row. Once the switch SWO2 is turned on after the voltage is stored in the second storage unit 132, the electric current source 30 supplies the signal line 17 with an electric current based on the voltage stored in the second storage unit 132.

It should be noted that the storage circuit 110 may store the voltage based on the reference electric current i1 from the reference electric current source I1 in the first storage unit 32 while the readout circuit 100 reads out the signal to the signal line 17. For example, in the storage circuit 110, while the switches SWS2 and SWD2 are turned off and the switch SWD2 is turned on to read out the signal to the signal line 17 by the readout circuit 110, the switches SWS1 and SWD1 are turned on to supply the reference electric current i1 from the reference electric current source I1 to the first storage unit 32. In response to the supply of the reference electric current i1, the first storage unit 32 stores the voltage based on the reference electric current i1.

Although the above embodiment illustrates the electric current source 30 as an electric current source for the readout circuit 100, which reads out the pixel signal, included in the image sensor 3, the present invention is not limited to this. The electric current source 30 is also applicable as an electric current source for the comparator circuit 21 of the analog/digital conversion circuit that converts the pixel signal into the digital signal and an electric current source for other source follower circuits in addition to the electronic circuits included in the image sensor 3. The electric current source 30 is further applicable to electronic circuits other than the source follower circuits.

According to the above embodiment, the following operational advantages can be achieved in addition to the same operational advantages as in the first embodiment.

(8) The storage circuit 110 includes the first storage unit 32 that stores a voltage based on the electric current i1 from the reference electric current source I1, a supply unit 130 that supplies the electric current generated by the voltage stored in the first storage unit 32, and a second storage unit 132 that stores a voltage based on the electric current supplied from the supply unit 130, wherein the electric current source 30 supplies the signal line 17 with the electric current generated by the voltage stored in the second storage unit 132. In this way, it is possible to generate an electric current in the supply unit 130 based on the reference electric current i1 of the reference electric current source I1 and cause the electric current source 30 to generate an electric current based on the electric current from the supply unit 130.

(9) The storage circuit 110 includes the control unit 33 that is provided between the supply unit 130 and the second storage unit 132 and controls the electric current from the reference electric current source I1 to the first storage unit 32 when the read out circuit 100 reads out a signal to the signal line 17 to be smaller than that when the read out circuit 100 does not read out a signal to the signal line 17. In this way, the readout circuit 100 can read the pixel signal to the signal line 17 based on the electric current generated by the voltage stored in the storage circuit 110. Additionally, power consumption can be reduced by adjusting to reduce the electric current i1 from the reference electric current source I1.

Third Embodiment

Figure 8:
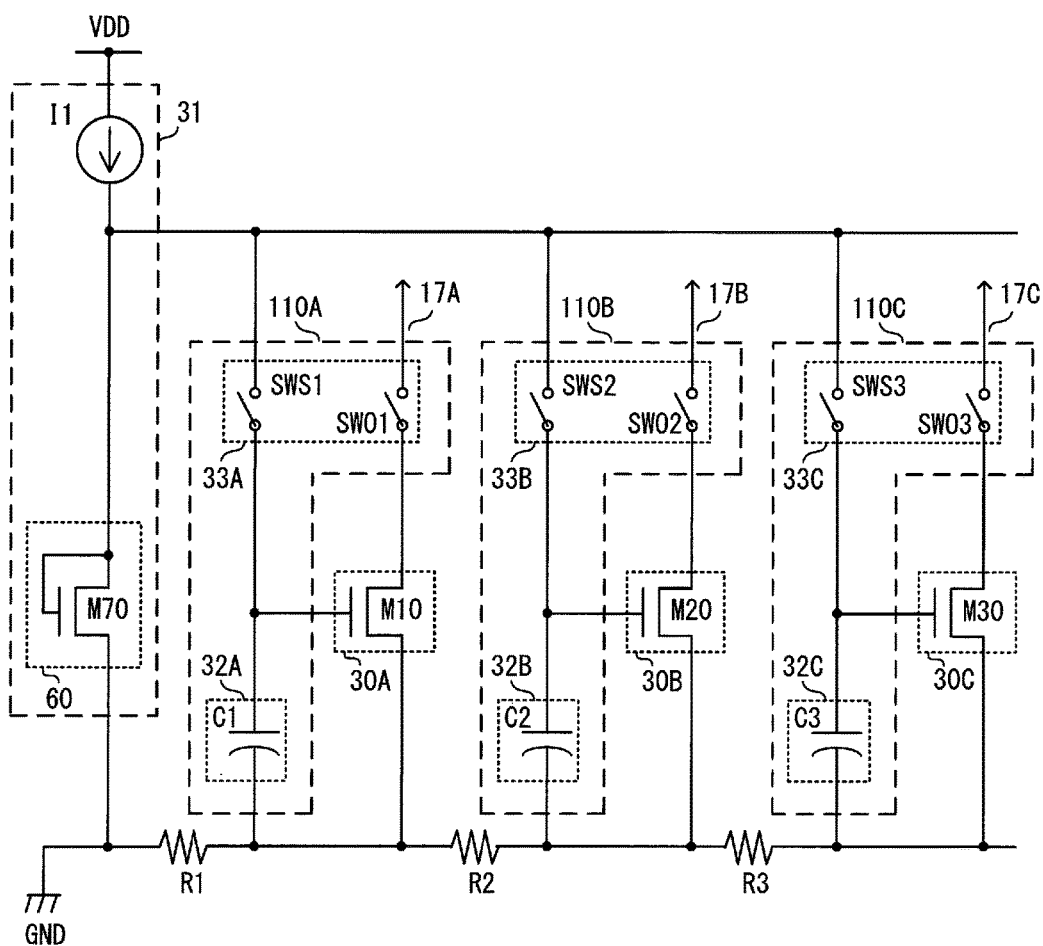
FIG. 8 is a circuit diagram illustrating a configuration of an electric current source 30 and a storage circuit 110 according to the third embodiment.

FIG. 8 is a circuit diagram illustrating a configuration of an electric current source 30 and a storage circuit 110 according to a third embodiment. It should be noted that parts that are the same or equivalent to those in the first embodiment are denoted by the same reference numerals in the figure, and differences will be mainly described. The first embodiment illustrated in FIG. 3 describes an example in which the reference electric current source I1 of the reference electric current source circuit 31 sequentially supplies the storage circuits 110A to 110C with the reference electric current i1 to store voltages based on the threshold voltages of the electric current sources 30A to 30C and the reference electric current i1. Contrastingly, in the third embodiment, the reference electric current source I1 of the reference electric current source circuit 31 supplies the reference voltage generator 60 with the reference electric current i1 to generate a reference voltage Vb and then store the reference voltage Vb in the storage circuits 110A to 110C in common.

In the third embodiment, the reference electric current source circuit 31 further includes the reference voltage generator 60 in addition to the reference electric current source I1. The reference voltage generator 60 includes a transistor M70, for example, and generates the reference voltage Vb based on the reference electric current i1 supplied by the reference electric current source I1 and the threshold voltage of the reference voltage generator 60. Control units 33A to 33C according to the third embodiment include switches SWS1 to SWS3 and switches SWO1 to SWO3, respectively.

The storage unit 32A and the switch SWS1, the storage unit 32B and the switch SWS2, and the storage unit 32C and the switch SWS3 are connected in parallel to the reference voltage generator 60. When the switches SWS1 to SWS3 are simultaneously turned on, the reference voltage Vb is stored in the storage units 32A to 32C.

In this way, since the reference voltage Vb generated by the reference voltage generator 60 is stored in the storage units 32A to 32C in common in the third embodiment, the switches SWS1 to SWS3 can be simultaneously turned on to store the reference voltage Vb.

When the switches SWS1 to SWS3 are turned off, capacitors C1 to C3 respectively constituting the storage units 32A to 32C hold the reference voltage Vb. When the switches SWO1 to SWO3 are turned on, the electric current sources 30A to 30C generate electric currents based on the reference voltage Vb stored in the storage units 32A to 32C, respectively, to supply the electric currents to the readout circuits 100 as a supply destinations.

Although the above embodiment illustrates the electric current source 30 as an electric current source for the readout circuit 100, which reads out the pixel signal, included in the image sensor 3, the present invention is not limited to this. The electric current source 30 is also applicable as an electric current source for the comparator circuit 21 of the analog/digital conversion circuit that converts the pixel signal into the digital signal and an electric current source for other source follower circuits in addition to the electronic circuits included in the image sensor 3. The electric current source 30 is further applicable to electronic circuits other than the source follower circuits.

According to the above embodiment, the following operational advantages can be achieved in addition to the same operational advantages as in the first embodiment.

(10) In the third embodiment, the image sensor 3 further includes the reference voltage generator 60 that generates the reference voltage Vb based on the reference electric current i1. In this way, it is possible to simultaneously store the reference voltage Vb based on the reference electric current i1 in the plurality of storage circuits 110A to 110C.

The following variations are also contemplated within the scope of the present invention, and one or more variations may be combined with the above embodiments.

First Variation

Figure 9A:
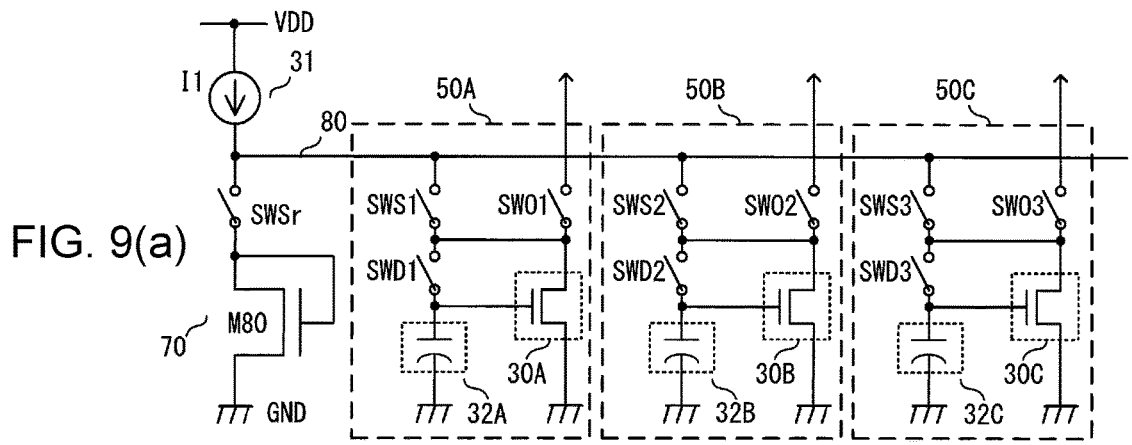
FIG. 9(a) is a diagram illustrating a configuration of an electric current source circuit 50 and its peripheral circuits according to a first variation.

FIG. 9(a) is a diagram illustrating a configuration of an electric current source circuit 50 and its peripheral circuits according to a first variation. An image sensor 3 according to the first variation further includes a precharge unit 70 and a switch SWSr. Electric current source circuits 50 (50A to 50C) according to the first variation are composed of electric current sources and storage units that are the same as the electric current sources 30A to 30C and the storage units 32A to 32C, respectively, illustrated in FIG. 3.

The precharge unit 70 includes a diode-connected transistor M80. The electric current source circuit 50A, the electric current source circuit 50B, and the electric current source circuit 50C are connected in parallel to the precharge unit 70 and the switch SWSr. Before each of the electric current source circuits 50A to 50C is supplied with the reference electric current i1, the precharge unit 70 applies a precharge voltage to a node 80 illustrated in FIG. 9(a) via the switch SWSr.

Figure 9B:
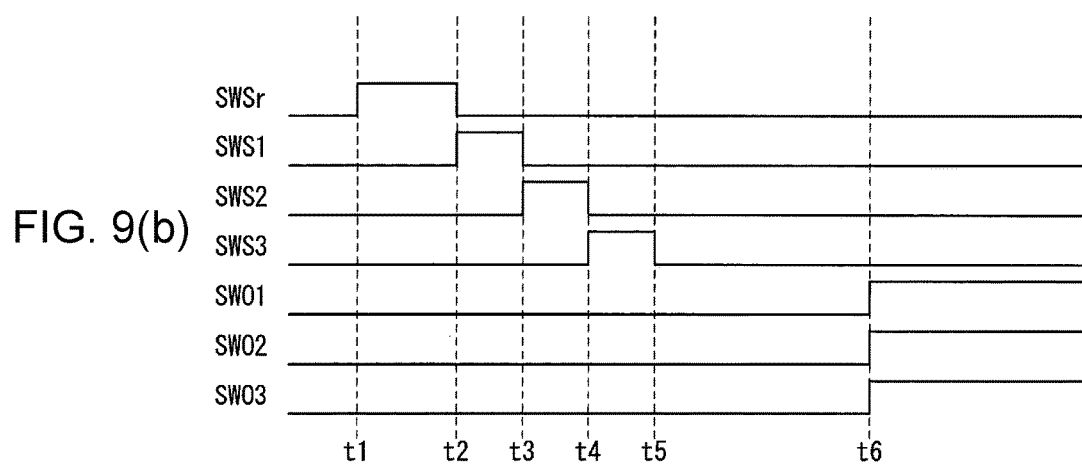
FIGS. 9(b) and 9(c) are timing charts illustrating an exemplary operation of the electric current source circuit 50 and its peripheral circuits according to the first variation.

FIG. 9(b) is a timing chart illustrating an exemplary operation of the electric current source circuit 50 and its peripheral circuits according to the first variation. Although not illustrated, it is assumed that the switches SWD1 and SWD3 are turned on at the same time as the switches SWS1 and SWS3, respectively, and are turned off prior to the switches SWS1 and SWS3.

At a time t1, a control signal of the switch SWSr is turned to high level so that the switch SWSr is turned on, and the reference electric current i1 is supplied to the precharge unit 70. The gate-source voltage Vgs of the precharge unit 70 becomes a predetermined value depending on the reference electric current i1 and the threshold voltage of the precharge unit 70. At the node 80, the gate-source voltage Vgs of the precharge unit 70 is set as the precharge voltage.

At a time t2, the control signal of the switch SWSr is turned to low level and the control signal of the switch SWS1 is turned to high level. Turning on the switch SWS1 allows the reference electric current i1 to be supplied to the electric current source circuit 50A via the node 80 to store a voltage in the storage unit 32A of the electric current source circuit 50A.

The time until the voltage based on the reference electric current i1 is reached can be shortened by setting the precharge voltage at the node 80 before the supply of the reference electric current i1, since storing the voltage begins from the precharge voltage level in the storage unit 32A of the electric current source circuit 50A.

In a period from a time t3 to a time t5, the voltage based on the reference electric current i1 is sequentially stored in the electric current source circuits 50B to 50C. At a time t6, the switches SWO1 to SWO3 are turned on so that each current source circuit 50 supplies the readout circuit 100 with an electric current based on the reference electric current i1.

Figure 9C:
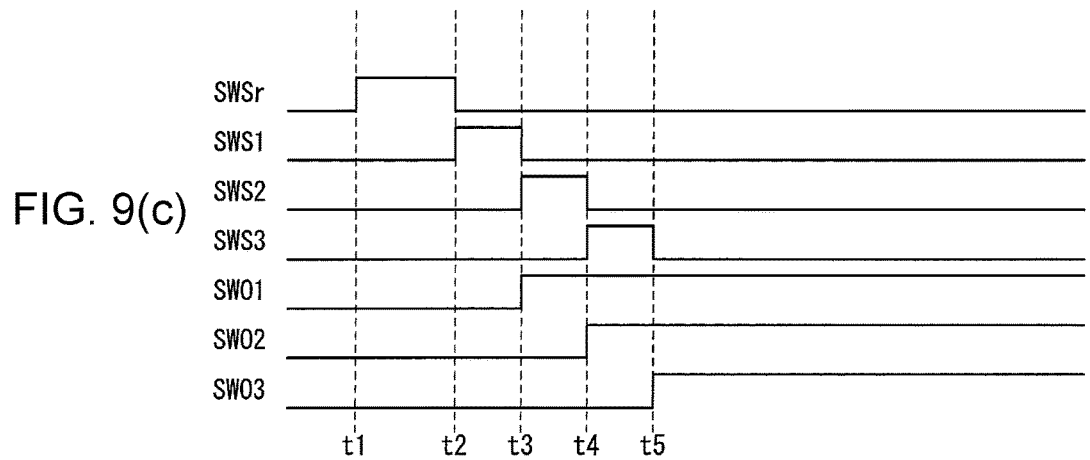

FIG. 9(c) is a timing chart illustrating an exemplary operation of the electric current source circuit 50 and its peripheral circuits according to the first variation. In FIG. 9(b) described above, the switches SWO1 to SWO3 are simultaneously turned on after the switches SWS1 to SWS3 are sequentially turned off. Contrastingly, in an example illustrated in FIG. 9(c), the switch SWO1 is turned on immediately after the switch SWS1 is turned on. Likewise, the switches SWO2, SWO3 are respectively turned on immediately after the switches SWS2 and SWS3 are turned on.

Although the first and second embodiments describe an example in which the switches SWO1 to SWO3 are simultaneously turned on. However, the switches SWO1 to SWO3 may be sequentially turned on in the same manner as in the example illustrated in FIG. 9(c).

Second Variation

Figure 10A:
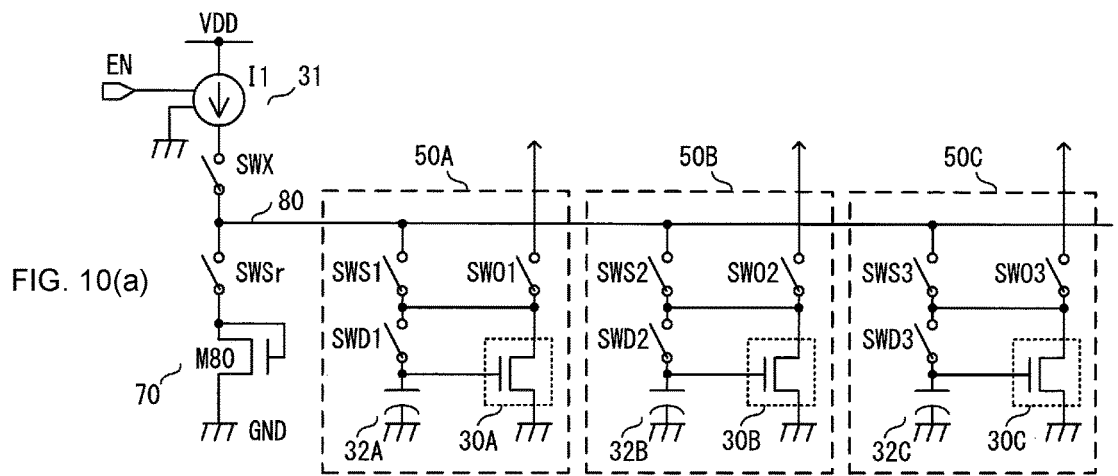
FIG. 10(a) is a diagram illustrating a configuration of an electric current source circuit 50 and its peripheral circuits according to a second variation.

FIG. 10(a) is a diagram illustrating a configuration of an electric current source circuit 50 and its peripheral circuits according to a second variation. An image sensor 3 according to the second variation further includes a switch SWX as compared with the first variation.

An EN signal inputted to the reference electric current source I1 is a signal for controlling the generation of the reference electric current i1 by the reference electric current source I1. The reference electric current source I1 generates the reference electric current i1 if the EN signal is at its high level and does not generate the reference electric current i1 if the EN signal is at its low level.

Figure 10B:
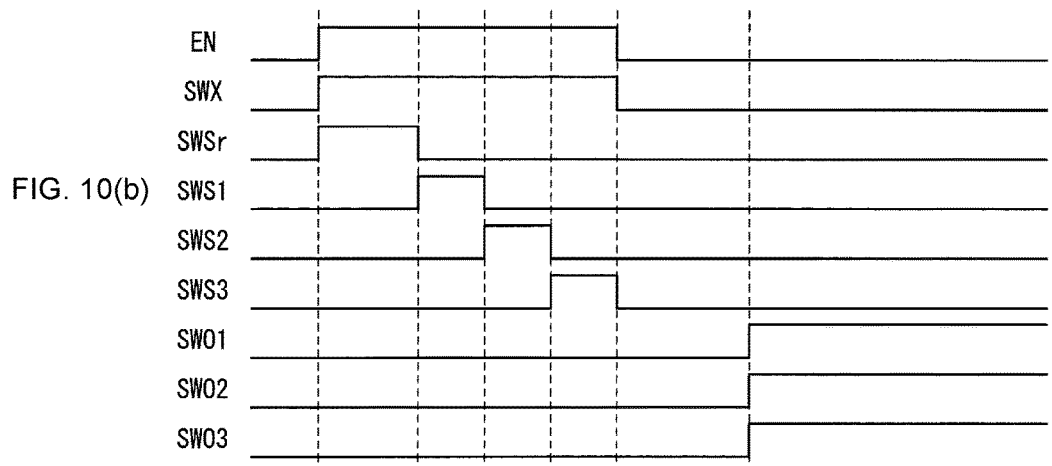
FIGS. 10(b) and 10(c) are timing charts illustrating an exemplary operation of the electric current source circuit 50 and its peripheral circuits according to the second variation.

FIG. 10(b) is a timing chart illustrating an exemplary operation of the electric current source circuit 50 and its peripheral circuits according to the second variation. Although not illustrated, it is assumed that the switches SWD1 and SWD3 are turned on at the same time as the switches SWS1 and SWS3, respectively, and are turned off prior to the switches SWS1 and SWS3.

At a time t1, the EN signal and the control signal of the switch SWX are turned to high level and the control signal of the switch SWSr is turned to high level. With the EN signal at its high level, the reference electric current source I1 is ready to output the reference electric current i1. The switches SWX and SWSr are turned on to connect the precharge unit 70 and the reference electric current source circuit 31. The precharge unit 70 generates a precharge voltage based on the reference electric current i1 and applies the precharge voltage to the node 80.

In a period from a time t2 to a time t5, the voltage based on the reference electric current i1 is sequentially stored in the electric current source circuits 50A to 50C in the same manner as in the first variation. Furthermore, at a time t5, the EN signal and the control signal of the switch SWX are turned to low level. With the EN signal at its low level, the reference electric current source I1 does not generate the reference electric current i1. Power consumption can be reduced by stopping the generation of the reference electric current i1. Turning off the switch SWX to disconnect the reference electric current source I1 and the node 80 prevents the voltage of the node 80 from dropping through the reference electric current source I1. At a time t6, the switches SWO1 to SWO3 are turned on so that the current source circuits 50A to 50C supply the readout circuits 100 with electric currents based on the reference electric current i1.

Figure 10C:
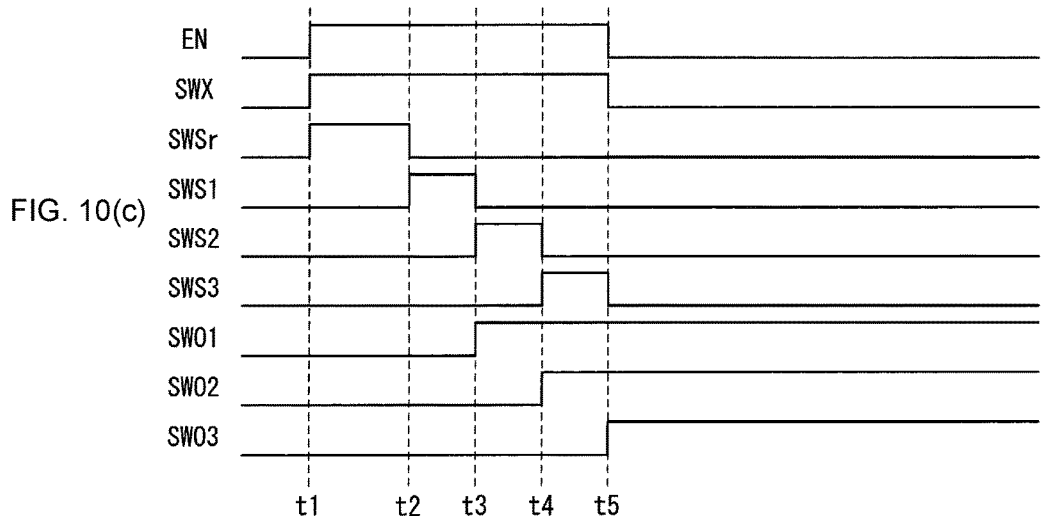

FIG. 10(c) is a timing chart illustrating an exemplary operation of the electric current source circuit 50 and its peripheral circuits according to the second variation. In the example illustrated in FIG. 10(c), the switch SWO1 is turned on immediately after the switch SWS1 is turned on. Likewise, the switches SWO2, SWO3 are respectively turned on immediately after the switches SWS2 and SWS3 are turned on.

Third Variation

Figure 11A:
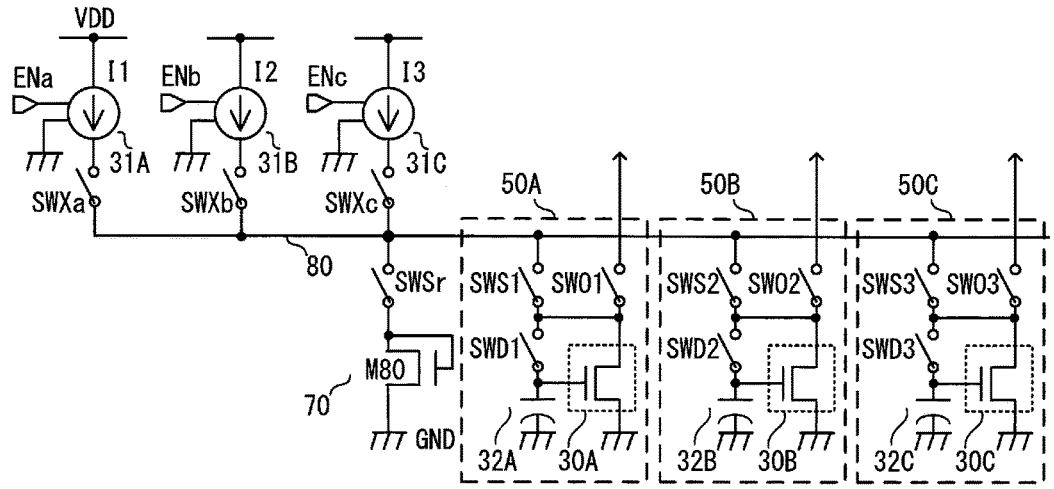
FIG. 11(a) is a diagram illustrating a configuration of an electric current source circuit 50 and its peripheral circuits according to a third variation.

FIG. 11(a) is a diagram illustrating a configuration of an electric current source circuit 50 and its peripheral circuits according to a third variation. An image sensor 3 according to the third variation includes reference electric current source circuits 31A to 31C. The reference electric current source circuits 31A to 31C include reference electric current sources I1 to I3, respectively. The reference electric current sources I1 to I3 generate reference electric currents i1 to i3 having different current values, respectively. Electric current source circuits 50 according to the third variation are composed of electric current sources and storage units that are the same as the electric current sources 30 and the storage units 32, respectively, illustrated in FIG. 3.

In this variation, the reference electric current to be supplied to each electric current source circuit 50 can be switched. FIG. 11(a) illustrates only three electric current source circuits 50 (electric current source circuits 50A to 50C). Variations in the electric current generated by each current source circuit 50 can be reduced by switching the reference electric current, which is supplied in advance, in accordance with characteristics of the control signal inputted to the switch SWD constituting each electric current source circuit 50.

Figure 11B:
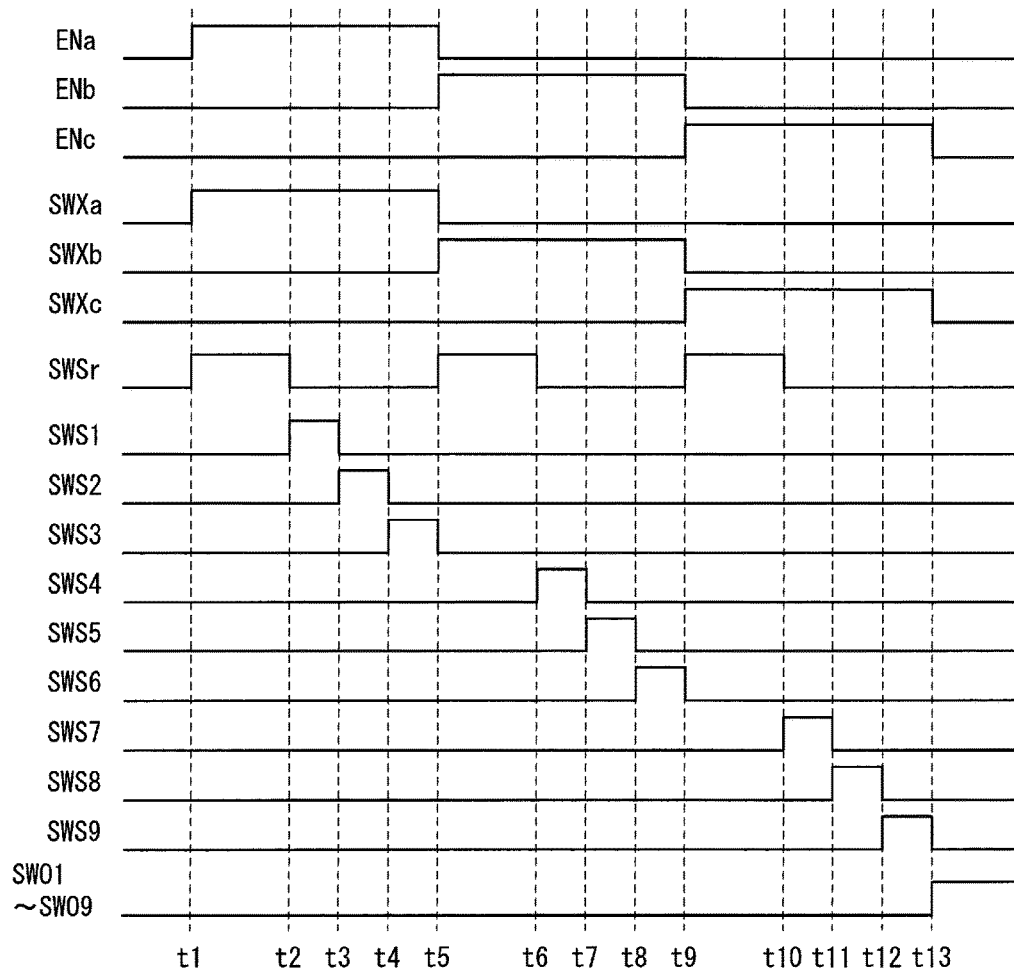
FIG. 11(b) is a timing chart illustrating an exemplary operation of the electric current source circuit 50 and its peripheral circuits according to the third variation.

FIG. 11(b) is a timing chart illustrating an exemplary operation of the electric current source circuit 50 and its peripheral circuits according to the third variation. Although not illustrated, it is assumed that the switch SWD is turned on at the same time as the switch SWS and is turned off prior to the switch SWS.

At a time t1, the ENa signal and the control signal of the switch SWXa are turned to high level and the control signal of the switch SWSr is turned to high level. With the ENa signal at its high level, the reference electric current source I1 is ready to output the reference electric current i1. The switches SWX and SWSr are turned on to connect the precharge unit 70 and the reference electric current source I1 The precharge unit 70 generates a precharge voltage based on the reference electric current i1 and applies the precharge voltage to the node 80.

At a time t2, the control signal of the switch SWSr is turned to low level and the control signal of the switch SWS1 is turned to high level. Turning on the switch SWS1 allows the reference electric current i1 to be supplied to the electric current source circuit 50A via the node 80 to store a voltage based on the reference electric current i1. In a period from a time t3 to a time t5, the voltage based on the reference electric current i1 is sequentially stored in the electric current source circuits 50B to 50C.

At a time t5, the ENa signal and the control signal of the switch SWXa are turned to low level, the ENb signal and the control signal of the switch SWXb are turned to high level, and the control signal of the switch SWSr is turned to high level. With the ENb signal at its high level, the reference electric current source I2 is ready to output a reference electric current i2. The switches SWXb and SWSr are turned on to connect the precharge unit 70 and the reference electric current source I2. The precharge unit 70 generates a precharge voltage based on the reference electric current i2 and applies the precharge voltage to the node 80.

In a period from a time t6 to a time t9, a voltage based on the reference electric current i2 is sequentially stored in electric current source circuits 50D to 50F (not shown) connected to SWS4 to SWS6, respectively, in the same manner as in the period from the time t2 to the time t5.

Furthermore, at a time t9, the ENb signal and the control signal of the switch SWXb are turned to low level, the ENc signal and the control signal of the switch SWXc are turned to high level, and the control signal of the switch SWSr is turned to high level. With the ENc signal at its high level, the reference electric current source I3 is ready to output the reference electric current i3. The switches SWXc and SWSr are turned on to connect the precharge unit 70 and the reference electric current source I3. The precharge unit 70 generates a precharge voltage based on the reference electric current i3 and applies the precharge voltage to the node 80.

In a period from a time t10 to a time t13, a voltage based on the reference electric current i3 is sequentially stored in electric current source circuits 50G to 50I (not shown) connected to the SWS7 to SWS9, respectively, in the same manner as in the period from the time t2 to the time t5.

At a time t13, the control signals of the switches SWO1 to SWO9 are simultaneously are turned to high level. The switches SWO1 to SWO9 are turned on so that the electric current source circuits 50A to 50I supply electric currents based on the voltages stored therein to their connection destinations.

Fourth Variation

Figure 12A:
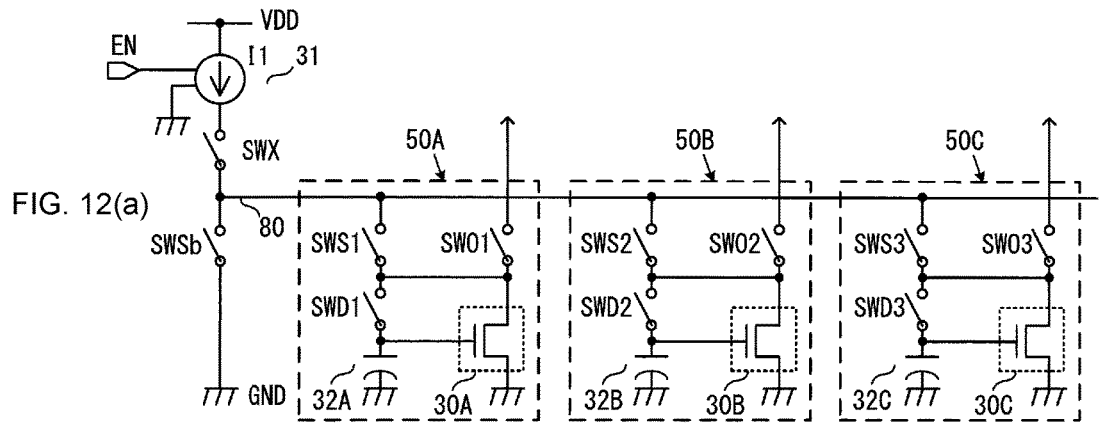
FIG. 12(a) is a diagram illustrating a configuration of an electric current source circuit 50 and its peripheral circuits according to a fourth variation.

FIG. 12(a) is a diagram illustrating a configuration of an electric current source circuit 50 and its peripheral circuits according to a fourth variation. An image sensor 3 according to the fourth variation further includes a switch SWSb. A control signal of the switch SWSb is turned to high level so that the switch SWSb is turned on. This supplies each electric current source circuit 50A to 50C with a ground level. Electric current source circuits 50 according to the fourth variation are composed of electric current sources and storage units that are the same as the electric current sources and the storage units illustrated in FIG. 3.

If pixel signals are read out from only some pixels 10 among all the pixels 10 of the image sensor 3, other pixels 10 are inactivated, that is, the electric current source 30 is disabled to generate electric currents. This can reduce power consumption. The electric current source 30 provides a power supply VDD level voltage if the electric current source 30 is composed of a PMOS transistor, and provides a ground level voltage if the electric current source 30 is composed of an NMOS transistor, so that the electric current source 30 is disabled to generate electric current. Here, the pixels 10 that allow the electric current source 30 to generate electric current are referred to as active pixels, and the pixels 10 that do not allow the electric current source 30 to generate electric current are referred to as inactive pixels.

Figure 12B:
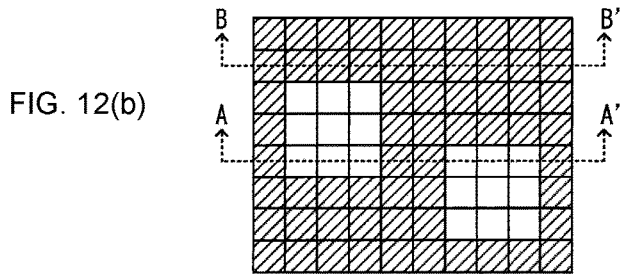
FIG. 12(b) is a diagram illustrating a configuration example of a part of the pixel 10 according to the fourth variation.

FIG. 12(b) is a diagram illustrating a configuration example of a part of the pixel 10 according to the fourth variation. In FIG. 12(b), hatched pixels 10 indicate inactive pixels and white pixels 10 indicate active pixels.

For example, from a first image frame, active pixels are determined as regions of interest. In a second image frame, voltages are stored in storage units 32 of inactive pixels so that the pixels are inactive, while voltages of storage units 32 of the active pixels are reset, that is, refreshing of the voltages is performed. Since refreshing of the voltages of the storage units 32 of the inactive pixels is unnecessary, the time required for refreshing of the voltages can be shortened. For example, for the line B-B' illustrated in FIG. 12(b), refreshing of voltages of the storage units 32 at third and subsequent frames can be eliminated.

FIG. 12(b) is a timing chart illustrating an exemplary operation of the electric current source circuit 50 and its peripheral circuits according to the fourth variation. Although not illustrated, it is assumed that the switch SWD is turned on at the same time as the switch SWS and is turned off prior to the switch SWS.

Figure 12C:
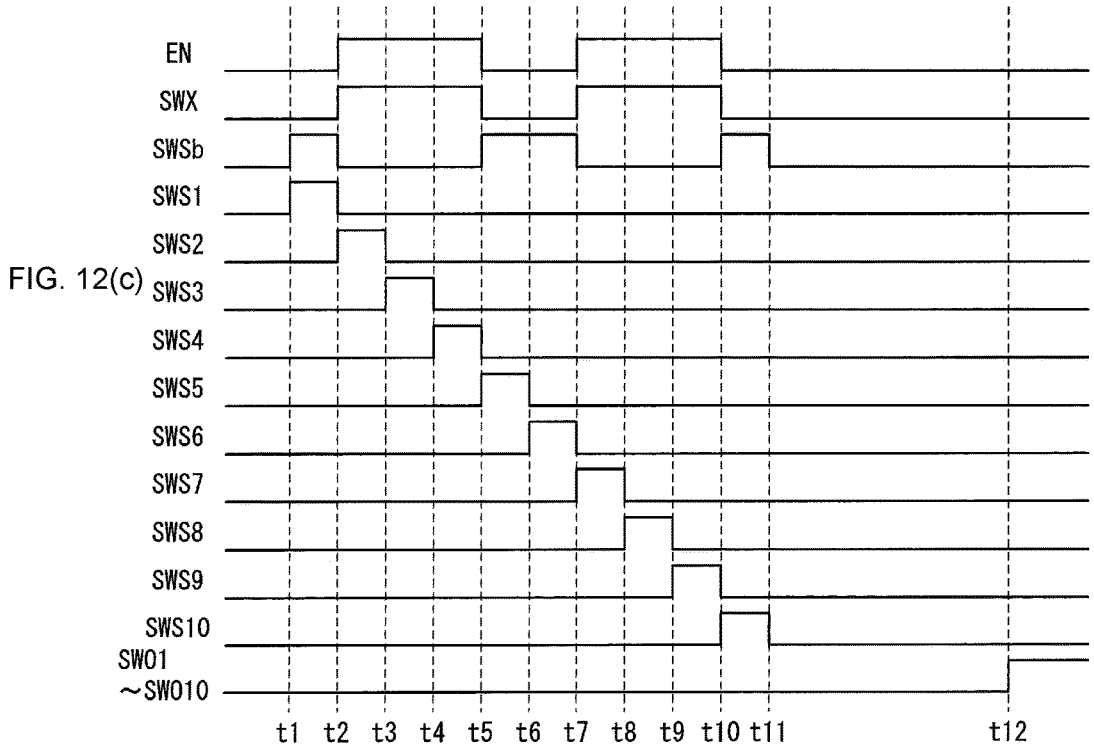
FIG. 12(c) is a timing chart illustrating an exemplary operation of the electric current source circuit 50 and its peripheral circuits according to the fourth variation.

In the example illustrated in FIG. 12(c), a voltage based on the reference electric current i1 is sequentially stored from the electric current source circuit (50A) connected to the leftmost pixel 10 to the electric current source circuit (50J) connected to the rightmost pixel 10 in a line A-A' illustrated in FIG. 12(b). At a time t1, the control signal of the switch SWSb is turned to high level and the control signal of the switch SWS1 is turned to high level. The switch SWSb and the switch SWS1 are turned on, so that a ground level (0 V) is stored in the storage unit 32A of the electric current source circuit 50A.

At a time t2, the EN signal and the control signal of the switch SWX are turned to high level, the control signal of the switch SWSb is turned to low level, and the control signal of the switch SWS2 is turned to high level. With the EN signal at its high level, the reference electric current source I1 is ready to output the reference electric current i1. Turning on the switches SWX and SWS2 allows the reference electric current i1 to be supplied to the electric current source circuit 50B to store a voltage based on the reference electric current i1 Likewise, in a period from a time t3 to a time t5, electric current source circuits 50C to 50D (not shown) are supplied with the reference electric current i1 to store a voltage based on the reference electric current i1.

Furthermore, at a time t5, the EN signal and the control signal of the switch SWX are turned to low level, the control signal of the switch SWSb is turned to high level, and the control signal of the switch SWS5 is turned to high level. With the EN signal at its low level, the reference electric current source I1 stops the generation of the reference electric current i1. The switch SWSb and the switch SWS5 are turned on, so that a ground level is stored in the electric current source circuit 50E (not shown). Likewise, in a period from a time t6 to a time t7, the ground level is stored in the electric current source circuit 50F (not shown).

At a time t7, the EN signal and the control signal of the switch SWX are turned to high level, the control signal of the switch SWSb is turned to low level, and the control signal of the switch SWS7 is turned to high level. Turning on the switches SWX and SWS7 allows the reference electric current i1 to be supplied to the electric current source circuit 50G (not shown) to store a voltage based on the reference electric current i1. Likewise, in a period from a time t8 to a time t10, the reference electric current i1 is supplied in electric current source circuits 50H to 50I (not shown) to set a voltage based on the reference electric current i1.

Furthermore, at a time t10, the EN signal and the control signal of the switch SWX are turned to low level, the control signal of the switch SWSb is turned to high level, and the control signal of the switch SWS10 is turned to high level. The switch SWSb and the switch SWS10 are turned on, so that a ground level is stored in the electric current source circuit 50J (not shown).

At a time t12, the switches SWO1 to SWO10 are turned on so that the electric current source circuits 50A to 50J generate electric currents based on the voltages stored in respective storage units 32 to be supplied to their connection destinations.

Fifth Variation

The above embodiment describes an example in which each electric current source 30 is composed of one transistor. However, as in the example illustrated in FIGS. 13(a) to 13(d), the electric current source 30 may include a cascode connection of a plurality of transistors M10 and M20. The electric current source 30 as a cascode configuration of the transistors can increase an output impedance of the electric current source 30 and reduce fluctuations in the electric current supplied by the electric current source 30.

FIGS. 13(a) to 13(d) are diagrams illustrating a configuration of an electric current source 30 and its peripheral circuits according to a fifth variation. FIGS. 14(a) to 14(c) are timing charts illustrating an exemplary operation of the electric current source 30 and its peripheral circuits according to the fifth variation. In the example illustrated in FIG. 13(a), the electric current source 30 and its peripheral circuits include reference electric current sources I1 and I2, transistors M10, M20, and M70, switches SWS, SWD, SWO, and SWC, and capacitors C1 and C2. The transistor M70 is supplied with a reference electric current i2 from the reference electric current source I2 to generate a voltage V2 based on the reference electric current i2 and a threshold voltage of the transistor M70.

As illustrated in FIG. 14(a), at a time t1, the switch SWC is turned on so that the capacitor C2 and a gate terminal of the transistor M20 are supplied with a voltage V2. Furthermore, the switches SWS and SWD are turned on so that a voltage V1 based on the reference electric current i1 from the reference electric current source I1 and the threshold voltage of the transistor M10 is stored in the capacitor C1. At a time t2, the switch SWD is turned off so that the voltage V1 is held in the capacitor C1. At a time t3, the switches SWC and SWS are turned off so that the voltage V2 is held in the capacitor C2. At a time t4, the switch SWO is turned on, and the electric current source 30 supplies an electric current to its connection destination.

Figure 13A:
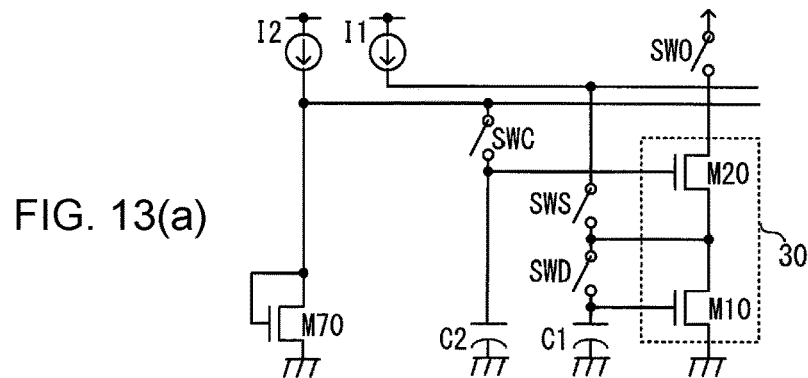
FIGS. 13(a) to 13(d) are diagrams illustrating a configuration of an electric current source 30 and its peripheral circuits according to a fifth variation.
Figure 13B:
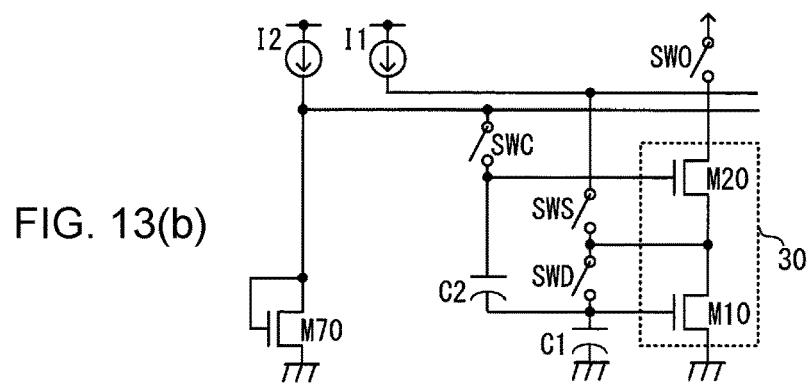
Figure 14A:
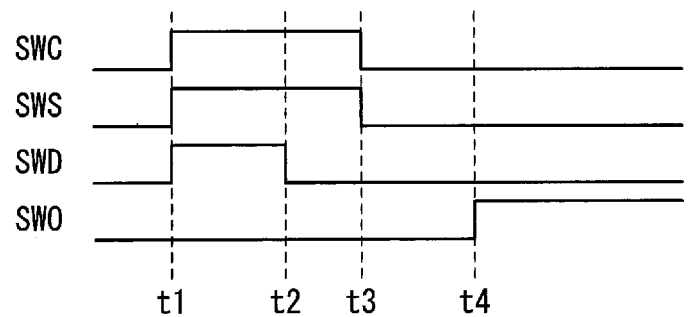
FIGS. 14(a) to 14(c) are timing charts illustrating an exemplary operation of the electric current source 30 and its peripheral circuits according to the fifth variation.
Figure 14B:
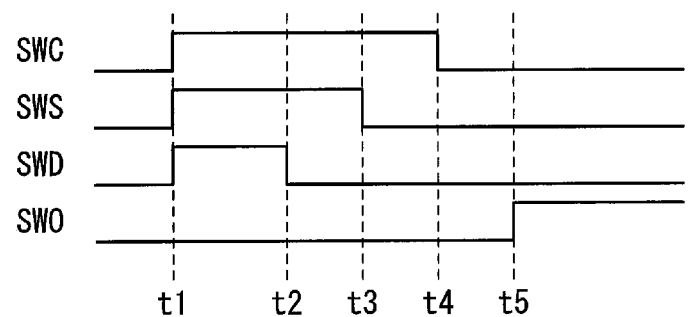
Figure 14C:
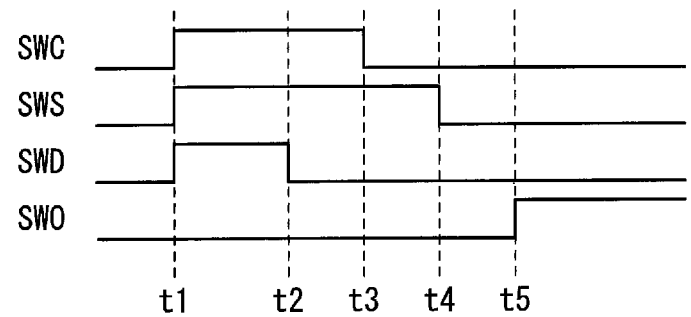

In an example illustrated in FIG. 13(b), a connection destination of the capacitor C2 is different from that in FIG. 13(a). As illustrated in FIG. 14(b), at a time t1, the voltage V2 is set at the capacitor C2 and the gate terminal of the transistor M20 in the same manner as in FIG. 13(a). A voltage V2 is stored in the capacitor C2 with reference to a potential of the capacitor C1 and a potential of a gate terminal of the transistor M10. Furthermore, a voltage V1 is stored in the capacitor C1 in the same manner as in FIG. 13(a).

At a time t2, the switch SWD is turned off so that the voltage V1 is held in the capacitor C1. The switch SWS is turned off at a time t3 and the switch SWC is turned off at a time t4 so that the voltage V2 is held in the capacitor C2. At a time t5, the electric current source 30 supplies an electric current to its connection destination.

Figure 13C:
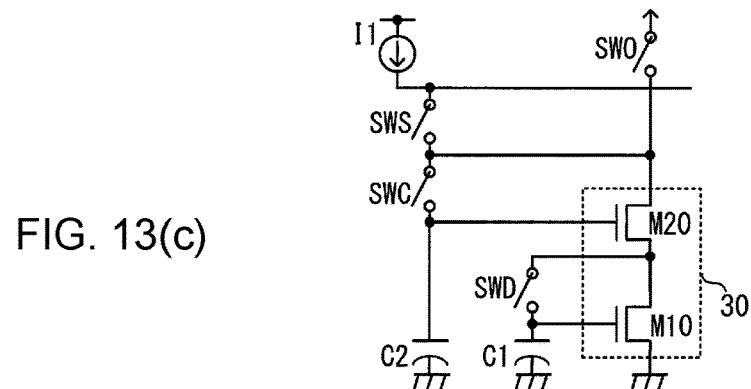
Figure 13D:
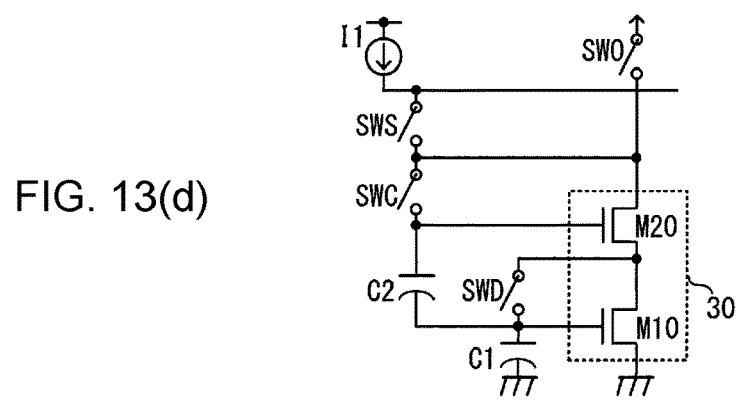

In the example illustrated in FIGS. 13(c) to 13(d), the electric current source 30 and its peripheral circuits include the reference electric current source I1, transistors M10 and M20, switches SWS, SWD, SWO, and SWC, and capacitors C1 and C2. The voltage V1 based on the reference electric current i1 and the threshold voltage of the transistor M10 is stored in the capacitor C1 and the voltage V2 based on the reference electric current i1 and the threshold voltage of the transistor M20 is stored in the capacitor C2. In the example illustrated in FIG. 13(c), the voltage V2 is stored in the capacitor C2 with reference to a ground potential. In the example illustrated in FIG. 13(d), a voltage V2 is stored in the capacitor C2 with reference to a potential of the capacitor C1 and a potential of a gate terminal of the transistor M10. On and off control is the same for the switches illustrated in FIGS. 13(c) and 13(d), and a control signal illustrated in FIG. 14(c) is inputted.

As illustrated in FIG. 14(c), at a time t1, a voltage V2 is stored in the capacitor C2 and a voltage V1 is stored in the capacitor C1. At a time t2, the switch SWD is turned off so that the voltage V1 is held in the capacitor C1. At a time t3, the switch SWC is turned off so that the voltage V2 is held in the capacitor C2. The switch SWS is turned off at a time t4 and the switch SWO is turned off at a time t5 so that the electric current source 30 supplies an electric current to its connection destination.

Sixth Variation

An image sensor 3 may be made of a single semiconductor substrate or a plurality of semiconductor substrates stacked each other. For example, the image sensor 3 is provided with a first semiconductor substrate provided with a readout circuit 100 and a second semiconductor substrate provided with a first storage unit 32 and a supply unit 130.

Although the above embodiments and variations illustrate the electric current source 30 as an electric current source for the readout circuit 100, which reads out the pixel signal, included in the image sensor 3 and an electric current source for the comparator circuit 21 of the analog/digital conversion circuit that converts the pixel signal into the digital signal, the present invention is not limited to this. The electric current source 30 is also applicable as an electric current source for other source follower circuits in addition to the electronic circuits included in the image sensor 3. The electric current source 30 is further applicable to electronic circuits other than the source follower circuits.

While various embodiments and variations have been described above, the present invention is not limited to these. Other aspects contemplated within the technical idea of the present invention are also included within the scope of the present invention.

The embodiments and variations described above also include the following image sensors and electric current source circuits.

(1) An image sensor, comprising: a readout circuit that reads out a signal to a signal line, the signal being generated by an electric charge resulting from a photoelectric conversion; a holding circuit that holds a voltage based on an electric current from a power supply circuit; and an electric current source including a transistor having a drain part connected to the signal line and a gate part connected to the holding circuit and the drain part, the electric current source supplying the signal line with an electric current generated by the voltage held in the holding circuit.

(2) In the image sensor as recited in (1), the holding circuit includes a first holding unit that holds the voltage based on the electric current from the power supply circuit, a supply unit that supplies an electric current generated by the voltage held in the first holding unit, and a second holding unit that holds a voltage based on the electric current supplied from the supply unit; and the electric current source supplies the signal line with an electric current generated by the voltage held in the second holding unit.

(3) In the image sensor as recited in (2), the holding circuit has a control unit that is provided between the supply unit and the second holding unit and controls an electric current flowing from the power supply circuit to the first holding unit when the readout circuit reads out the signal to the signal line to be smaller than that when the readout circuit does not read out the signal to the signal line.

(4) In the image sensor as recited in (2) or (3), the holding circuit holds a voltage based on the electric current from the power supply circuit in the first holding unit when the readout circuit reads out the signal to the signal line.

(5) In the image sensor as recited in (2) or (3), the first holding unit and the supply unit are provided on a second semiconductor substrate different from the first semiconductor substrate provided with the readout circuit.

(6) In the image sensor as recited in (5), the first semiconductor substrate is stacked by the second semiconductor substrate.

(7) An image-capturing apparatus comprising the image sensor as recited in (1) to (6).

(8) An image sensor, comprising: a first readout circuit that reads out a first signal to a first signal line, the first signal being generated by an electric charge resulting from a photoelectric conversion; a second readout circuit that reads out a second signal to a second signal line, the second signal being generated by an electric charge resulting from a photoelectric conversion; a first holding circuit that holds a voltage based on an electric current from a power supply circuit; a second holding circuit that holds a voltage based on the electric current from the power supply circuit; a first electric current source including a first transistor having a first drain part connected to the first signal line and a first gate part connected to the first holding circuit and the first drain part, the first electric current source supplying the first signal line with an electric current generated by the voltage held in the first holding circuit; and a second electric current source including a second transistor having a second drain part connected to the second signal line and a second gate part connected to the second holding circuit and the second drain part, the second electric current source supplying the second signal line with an electric current generated by the voltage held in the second holding circuit.

(9) In the image sensor as recited in (8), the second holding circuit holds a voltage based on the electric current from the power supply circuit after the voltage based on the electric current from the power supply circuit is held in the first holding circuit.

(10) In the image sensor as recited in (8) or (9), the first holding circuit has a first control unit that controls an electric current from the power supply circuit when the first readout circuit reads out the first signal to the first signal line to be smaller than that when the first readout circuit does not read out the first signal to the first signal line; and the second holding circuit has a second control unit that controls an electric current from the power supply circuit when the second readout circuit reads out the second signal to the second signal line to be smaller than that when the second readout circuit does not read out the second signal to the second signal line.

(11) In the image sensor as recited in (8), the first holding circuit includes a first holding unit that holds a voltage based on the electric current from the power supply circuit, a first supply unit that outputs an electric current generated by the voltage stored in the first holding unit, and a second holding unit that holds a voltage based on the electric current supplied from the first supply unit; the second holding circuit includes a third holding unit that holds a voltage based on the electric current from the power supply circuit, a second supply unit that outputs an electric current generated by the voltage stored in the third holding unit, and a fourth holding unit that holds a voltage based on the electric current supplied from the second supply unit; the first current source supplies the first signal line with an electric current generated by the voltage held in the second holding unit; and the second current source supplies the second signal line with an electric current generated by the voltage held in the fourth holding unit.

(12) In the image sensor as recited in (11), the first holding circuit has a first control unit that is provided between the first supply unit and the second holding unit and controls an electric current flowing from the power supply circuit to the second holding unit when the first readout circuit reads out the first signal to the first signal line to be smaller than that when the first readout circuit does not read out the first signal to the first signal line; and the second holding circuit has a second control unit that is provided between the second supply unit and the fourth holding unit and controls an electric current flowing from the power supply circuit to the fourth holding unit when the second readout circuit reads out the second signal to the second signal line to be smaller than that when the second readout circuit does not read out the second signal to the second signal line.

(13) In the image sensor as recited in (11) or (12), the first holding circuit holds a voltage based on the electric current from the power supply circuit in the first holding unit when the first readout circuit reads out the first signal to the first signal line; and the second holding circuit holds a voltage based on the electric current from the power supply circuit in the fourth holding unit when the second readout circuit reads out the second signal to the second signal line.

(14) In the image sensor as recited in (11) to (13), the third holding unit holds a voltage based on the electric current from the power supply circuit after the voltage based on the electric current from the power supply circuit is held in the first holding unit.

(15) In the image sensor as recited in (11) to (14), the first holding unit, the second holding unit, the first supply unit, and the second supply unit are provided on a second semiconductor substrate different from the first semiconductor substrate provided with the first readout circuit and the second readout circuit.

(16) In the image sensor as recited in (15), the first semiconductor substrate is stacked by the second semiconductor substrate.

(17) An image-capturing apparatus comprising the image sensor as recited in (8) to (16).

(18) An electronic device, comprising: an electronic circuit having a plurality of electronic elements; a holding circuit that holds a voltage based on an electric current from a power supply circuit; and an electric current source including a transistor having a drain part connected to the electronic circuit and a gate part connected to the holding circuit and the drain part, the electric current source supplying the electronic circuit with an electric current generated by the voltage held in the holding circuit.

(19) In the electronic device as recited in (18), the electronic device comprises a first control unit and a second control unit that are provided between the power supply circuit and the holding circuit and control an electrical connection between the power supply circuit and the holding circuit, and the holding circuit and the drain part are connected to each other via the first control unit; and the power supply circuit and the first control unit are connected to each other via the second control unit.

(20) In the electronic device as recited in (18) or (19), the holding circuit includes a first holding unit that holds the voltage based on the electric current from the power supply circuit, a supply unit that supplies an electric current generated by the voltage held in the first holding unit, and a second holding unit that holds a voltage based on the electric current supplied from the supply unit; and the electric current source supplies the electronic circuit with the electric current generated by the voltage held in the second holding unit.

(21) In the electronic device as recited in (20), the holding circuit holds a voltage based on the electric current from the power supply circuit in the first holding unit during an operation of the electronic circuit.

(22) In the electronic device as recited in (18) to (21), the power supply circuit includes a plurality of electric current source circuits that supply electric currents having different electric current values; and the holding circuit holds a voltage based on an electric current from a selected electric current source circuit among the plurality of electric current source circuits.

(23) In the electronic device as recited in (18) to (22), the electronic device comprises a third control unit that disables the electric current source to supply an electric current to the electronic circuit.

(24) In the electronic device as recited in (23), the third control unit is connected to a ground.

(25) In the electronic device as recited in (18) to (24), the electric current source includes a cascode connection of a plurality of transistors including the transistor.

(26) In the electronic device as recited in (20) or (21), the first holding unit and the supply unit are provided on a second semiconductor substrate different from the first semiconductor substrate provided with the electronic circuit.

(27) In the electronic device as recited in (26), the first semiconductor substrate is stacked by the second semiconductor substrate.

(28) In the electronic device as recited in (18) to (27), the electronic circuit is a readout circuit that reads out a signal generated by an electric charge resulting from a photoelectric conversion.

(29) In the electronic device as recited in (18) to (27), the electronic circuit is a comparator constituting a convertor that converts an analog signal into a digital signal.

Additionally, the embodiments and variations described above also include the following image sensors and image-capturing apparatuses.

(1) An image sensor, comprising: a readout circuit that reads out a signal to a signal line, the signal being generated by an electric charge resulting from a photoelectric conversion; a storage circuit that stores a voltage based on an electric current from a reference electric current source; an electric current source that supplies the signal line with an electric current for causing the readout circuit 100 to read out the signal, and supplies the signal line with an electric current generated by the voltage stored in the storage circuit.

(2) In the image sensor as recited in (1), the storage circuit includes: a first storage unit that stores a voltage based on an electric current from the reference electric current source; a supply unit that supplies an electric current generated by the voltage stored in the first storage unit; and a second storage unit that storages a voltage based on an electric current supplied from the supply unit, wherein the electric current source supplies the signal line with an electric current generated by the voltage stored in the second storage unit.

(3) In the image sensor as recited in (2), the storage circuit has an adjustment unit that is provided between the supply unit and the second storage unit and adjusts an electric current flowing from the reference electric current source to the first storage unit when the readout circuit reads out the signal to the signal line to be smaller than that when the readout circuit does not read out the signal to the signal line.

(4) In the image sensor as recited in (3), the storage circuit stores a voltage based on the electric current from the reference electric current source in the first storage unit when the readout circuit reads out the signal to the signal line.

(5) In the image sensor as recited in (1) to (4), the electric current source has a transistor including a drain part connected to the signal line and a gate part connected to the storage circuit and the drain part.

(6) In the image sensor as recited in (2) to (4), the first storage unit and the supply unit are provided on a second semiconductor substrate different from the first semiconductor substrate provided with the readout circuit.

(7) In the image sensor as recited in (6), the first semiconductor substrate is stacked by the second semiconductor substrate.

(8) An image-capturing apparatus comprising the image sensor as recited in (1) to (7).

(9) An image sensor, comprising: a first readout circuit that reads out a first signal to a first signal line, the first signal being generated by an electric charge resulting from a photoelectric conversion; a second readout circuit that reads out a second signal to a second signal line, the second signal being generated by an electric charge resulting from a photoelectric conversion; a first storage circuit that stores a voltage based on an electric current from a reference electric current source; a second storage circuit that stores a voltage based on an electric current from the reference electric current source; a first electric current source that supplies the first signal line with an electric current for causing the first readout circuit 100 to read out the first signal, and supplies the first signal line with an electric current generated by the voltage stored in the first storage circuit, and a second electric current source that supplies the second signal line with an electric current for causing the second readout circuit 100 to read out the second signal, and supplies the second signal line with an electric current generated by the voltage stored in the second storage circuit.

(10) In the image sensor as recited in (9), the second storage circuit stores a voltage based on the electric current from the reference electric current source after the voltage based on the electric current from the reference electric current source is stored in the first storage circuit.

(11) In the image sensor as recited in (9) or (10), the first storage circuit has a first adjustment unit that adjusts an electric current from the reference electric current source when the first readout circuit reads out the first signal to the first signal line to be smaller than that when the first readout circuit does not read out the first signal to the first signal line, and the second storage circuit has a second adjustment unit that adjusts an electric current from the reference electric current source when the second readout circuit reads out the second signal to the second signal line to be smaller than that when the first readout circuit does not read out the second signal to the second signal line

(12) In the image sensor as recited in (9), the first storage circuit includes a first storage unit that stores a voltage based on the electric current from the reference electric current source, a first supply unit that outputs an electric current generated by the voltage stored in the first storage unit, and a second storage unit that stores a voltage based on the electric current supplied from the first supply unit; the second storage circuit includes a third storage unit that stores a voltage based on the electric current from the reference electric current source, a second supply unit that outputs an electric current generated by the voltage stored in the third storage unit, and a fourth storage unit that stores a voltage based on the electric current supplied from the second supply unit, wherein the first electric current source supplies the first signal line with an electric current generated by a voltage stored in the second storage unit; and the second electric current source supplies the second signal line with an electric current generated by a voltage stored in the fourth storage unit.

(13) In the image sensor as recited in (12), the first storage circuit has a first adjustment unit that is provided between the first supply unit and the second storage unit and adjusts an electric current flowing from the reference electric current source to the second storage unit when the first readout circuit reads out the first signal to the first signal line to be smaller than that when the first readout circuit does not read out the first signal to the first signal line; and the second storage circuit has a second adjustment unit that is provided between the second supply unit and the fourth storage unit and adjusts an electric current flowing from the reference electric current source to the fourth storage unit when the second readout circuit reads out the second signal to the second signal line to be smaller than that when the second readout circuit does not read out the second signal to the second signal line.

(14) In the image sensor as recited in (12) or (13), the first storage circuit stores a voltage based on the electric current from the reference electric current source in the first storage unit when the first readout circuit reads out the first signal to the first signal line; the second storage circuit stores a voltage based on the electric current from the reference electric current source in the fourth storage unit when the second readout circuit reads out the second signal to the second signal line.

(15) In the image sensor as recited in (12) to (14), the third storage circuit stores a voltage based on the electric current from the reference electric current source after the voltage based on the electric current from the reference electric current source is stored in the first storage circuit.

(16) In the image sensor as recited in (9) to (15), the first electric current source includes a first transistor having a first drain part connected to the first signal line and a first gate part connected to the first storage circuit and the first drain part; and the second electric current source includes a second transistor having a second drain part connected to the second signal line and a second gate part connected to the second storage circuit and the second drain part.

(17) In the image sensor as recited in (12) to (15), the first storage unit and the second storage, the first supply unit, and the second supply unit are provided on a second semiconductor substrate different from the first semiconductor substrate provided with the first readout circuit and the second readout circuit.

(18) In the image sensor as recited in (17), the first semiconductor substrate is stacked by the second semiconductor substrate.

(19) An image-capturing device comprising the image sensor as recited in (9) to (18).

The disclosure of the following priority application is herein incorporated by reference:

Japanese Patent Application No. 2015-195279 (filed Sep. 30, 2015)

REFERENCE SIGNS LIST

3 . . . image sensor, 17 . . . signal line, 30 . . . electric current source, 100 . . . readout circuit, 110 . . . storage circuit

The invention claimed is:

1. An image sensor, comprising:
a readout circuit that reads out a signal to a signal line, the signal being generated by an electric charge resulting from a photoelectric conversion;
a holding circuit that holds a voltage based on an electric current from a power supply circuit; and
an electric current source including a transistor having a drain part connected to the signal line and a gate part connected to the holding circuit and the drain part, the electric current source supplying the signal line with an electric current generated by the voltage held in the holding circuit.

2. The image sensor according to claim 1, wherein:
the holding circuit includes a first holding unit that holds the voltage based on the electric current from the power supply circuit, a supply unit that supplies an electric current generated by the voltage held in the first holding unit, and a second holding unit that holds a voltage based on the electric current supplied from the supply unit; and
the electric current source supplies the signal line with an electric current generated by the voltage held in the second holding unit.

3. The image sensor according to claim 2, wherein:
the holding circuit has a control unit that is provided between the supply unit and the second holding unit and controls an electric current flowing from the power supply circuit to the first holding unit while the readout circuit reads out the signal to the signal line to be smaller than that while the readout circuit does not read out the signal to the signal line.

4. The image sensor according to claim 2, wherein:
the holding circuit holds the voltage based on the electric current from the power supply circuit in the first holding unit while the readout circuit reads out the signal to the signal line.

5. The image sensor according to claim 2, wherein:
the first holding unit and the supply unit are provided on a second semiconductor substrate different from a first semiconductor substrate provided with the readout circuit.

6. The image sensor according to claim 5, wherein:
the first semiconductor substrate is stacked by the second semiconductor substrate.

7. An image-capturing apparatus comprising the image sensor according to claim 1.

8. An image sensor, comprising:
a first readout circuit that reads out a first signal to a first signal line, the first signal being generated by an electric charge resulting from a photoelectric conversion;
a second readout circuit that reads out a second signal to a second signal line, the second signal being generated by an electric charge resulting from a photoelectric conversion;
a first holding circuit that holds a voltage based on an electric current from a power supply circuit;
a second holding circuit that holds a voltage based on the electric current from the power supply circuit;
a first electric current source including a first transistor having a first drain part connected to the first signal line and a first gate part connected to the first holding circuit and the first drain part, the first electric current source supplying the first signal line with an electric current generated by the voltage held in the first holding circuit; and
a second electric current source including a second transistor having a second drain part connected to the second signal line and a second gate part connected to the second holding circuit and the second drain part, the second electric current source supplying the second signal line with an electric current generated by the voltage held in the second holding circuit.

9. The image sensor according to claim 8, wherein:
the second holding circuit holds the voltage based on the electric current from the power supply circuit after the voltage based on the electric current from the power supply circuit is held in the first holding circuit.

10. The image sensor according to claim 8, wherein:
the first holding circuit has a first control unit that controls an electric current from the power supply circuit while the first readout circuit reads out the first signal to the first signal line to be smaller than that while the first readout circuit does not read out the first signal to the first signal line; and
the second holding circuit has a second control unit that controls an electric current from the power supply circuit while the second readout circuit reads out the second signal to the second signal line to be smaller than that while the second readout circuit does not read out the second signal to the second signal line.

11. The image sensor according to claim 8, wherein:
the first holding circuit includes a first holding unit that holds the voltage based on the electric current from the power supply circuit, a first supply unit that outputs an electric current generated by the voltage stored in the first holding unit, and a second holding unit that holds a voltage based on the electric current supplied from the first supply unit;
the second holding circuit includes a third holding unit that holds the voltage based on the electric current from the power supply circuit, a second supply unit that outputs an electric current generated by the voltage stored in the third holding unit, and a fourth holding unit that holds a voltage based on the electric current supplied from the second supply unit;
the first current source supplies the first signal line with an electric current generated by the voltage held in the second holding unit; and
the second current source supplies the second signal line with an electric current generated by the voltage held in the fourth holding unit.

12. The image sensor according to claim 11, wherein:
the first holding circuit has a first control unit that is provided between the first supply unit and the second holding unit and controls an electric current flowing from the power supply circuit to the second holding unit while the first readout circuit reads out the first signal to the first signal line to be smaller than that while the first readout circuit does not read out the first signal to the first signal line; and the second holding circuit has a second control unit that is provided between the second supply unit and the fourth holding unit and controls an electric current flowing from the power supply circuit to the fourth holding unit while the second readout circuit reads out the second signal to the second signal line to be smaller than that while the second readout circuit does not read out the second signal to the second signal line.

13. The image sensor according to claim 11, wherein:
the first holding circuit holds the voltage based on the electric current from the power supply circuit in the first holding unit while the first readout circuit reads out the first signal to the first signal line; and
the second holding circuit holds the voltage based on the electric current from the power supply circuit in the fourth holding unit while the second readout circuit reads out the second signal to the second signal line.

14. The image sensor according to claim 11, wherein:
the third holding unit holds the voltage based on the electric current from the power supply circuit after the voltage based on the electric current from the power supply circuit is held in the first holding unit.

15. The image sensor according to claim 11, wherein:
the first holding unit, the second holding unit, the first supply unit, and the second supply unit are provided on a second semiconductor substrate different from a first semiconductor substrate provided with the first readout circuit and the second readout circuit.

16. The image sensor according to claim 15, wherein:
the first semiconductor substrate is stacked by the second semiconductor substrate.

17. An image-capturing apparatus comprising the image sensor according to claim 8.

18. An electronic device, comprising:
an electronic circuit having a plurality of electronic elements;
a holding circuit that holds a voltage based on an electric current from a power supply circuit; and
an electric current source including a transistor having a drain part connected to the electronic circuit and a gate part connected to the holding circuit and the drain part, the electric current source supplying the electronic circuit with an electric current generated by the voltage held in the holding circuit.

19. The electronic device according to claim 18, comprising:
a first control unit and a second control unit that are provided between the power supply circuit and the holding circuit and control an electrical connection between the power supply circuit and the holding circuit, wherein:

the holding circuit and the drain part are connected to each other via the first control unit; and
the power supply circuit and the first control unit are connected to each other via the second control unit.

20. The electronic device according to claim 18, wherein:
the holding circuit includes a first holding unit that holds the voltage based on the electric current from the power supply circuit, a supply unit that supplies an electric current generated by the voltage held in the first holding unit, and a second holding unit that holds a voltage based on the electric current supplied from the supply unit; and
the electric current source supplies the electronic circuit with an electric current generated by the voltage held in the second holding unit.

21. The electronic device according to claim 20, wherein:
the holding circuit holds the voltage based on the electric current from the power supply circuit in the first holding unit during an operation of the electronic circuit.

22. The electronic device according to claim 20, wherein:
the first holding unit and the supply unit are provided on a second semiconductor substrate different from a first semiconductor substrate provided with the electronic circuit.

23. The electronic device according to claim 22, wherein:
the first semiconductor substrate is stacked by the second semiconductor substrate.

24. The electronic device according to claim 18, wherein:
the power supply circuit includes a plurality of electric current source circuits that supply electric currents having different electric current values; and
the holding circuit holds a voltage based on an electric current from a selected electric current source circuit among the plurality of electric current source circuits.

25. The electronic device according to claim 18, comprising:
a third control unit that disables the electric current source to supply an electric current to the electronic circuit.

26. The electronic device according to claim 25, wherein:
the third control unit is connected to a ground.

27. The electronic device according to claim 18, wherein:
the electric current source includes a cascode connection of a plurality of transistors including the transistor.

28. The electronic device according to claim 18, wherein:
the electronic circuit is a readout circuit that reads out a signal generated by an electric charge resulting from a photoelectric conversion.

29. The electronic device according to claim 18, wherein:
the electronic circuit is a comparator constituting a convertor that converts an analog signal into a digital signal.

* * * * *